(12) United States Patent
Prokop et al.

(10) Patent No.: US 11,575,698 B2
(45) Date of Patent: Feb. 7, 2023

(54) METHOD, SYSTEM, AND COMPUTER PROGRAM PRODUCT FOR IDENTIFYING A MALICIOUS USER

(71) Applicant: Visa International Service Association, San Francisco, CA (US)

(72) Inventors: Bartlomiej Piotr Prokop, Antrim (GB); Kerry Philomena McGullion, Enniskillen (GB); Peter Jackson Lennon, Belfast (GB); Thomas Joseph Looney, Belfast (GB)

(73) Assignee: Visa International Service Association, San Francisco, CA (US)

( * ) Notice: Subject to any disclaimer, the term of this patent is extended or adjusted under 35 U.S.C. 154(b) by 271 days.

(21) Appl. No.: 16/872,733

(22) Filed: May 12, 2020

(65) Prior Publication Data

US 2020/0366700 A1 Nov. 19, 2020

Related U.S. Application Data

(60) Provisional application No. 62/848,191, filed on May 15, 2019.

(51) Int. Cl.
| | |
|---|---|
| *H04L 9/40* | (2022.01) |
| *G06F 21/32* | (2013.01) |
| *G06Q 10/10* | (2012.01) |
| *G06Q 30/00* | (2012.01) |
| *G06Q 50/26* | (2012.01) |

(Continued)

(52) U.S. Cl.
CPC .......... *H04L 63/1425* (2013.01); *G06F 21/32* (2013.01); *G06Q 10/10* (2013.01); *G06Q 30/0185* (2013.01); *G06Q 50/265* (2013.01); *G06V 40/1365* (2022.01); *H04L 63/06* (2013.01); *H04L 63/10* (2013.01); *H04L 63/1441* (2013.01); *H04L 67/02* (2013.01); *G06Q 20/40* (2013.01)

(58) Field of Classification Search
CPC ...... H04L 67/28; H04L 63/1441; H04L 63/06
See application file for complete search history.

(56) References Cited

U.S. PATENT DOCUMENTS

| | | | |
|---|---|---|---|
| 10,911,483 B1 * | 2/2021 | Wasiq | H04L 63/06 |
| 2010/0100962 A1 * | 4/2010 | Boren | H04L 63/1441 |
| | | | 726/25 |

(Continued)

OTHER PUBLICATIONS

Boshmaf et al., "Design and analysis of a social botnet", Computer Networks, Elsevier, Jun. 27, 2012, vol. 57, No. 2,Amsterdam, NL, 23 pages.

(Continued)

*Primary Examiner* — Barbara B Anyan
(74) *Attorney, Agent, or Firm* — The Webb Law Firm

(57) ABSTRACT

A method, system, and computer program product for identifying a malicious user obtain a plurality of service requests for a service provided by a processing system, each service request of the plurality of service requests being associated with a requesting user and a requesting system, and a plurality of service responses associated with the plurality of service requests, each service response of the plurality of service responses being associated with the processing system; and identify the requesting user as malicious based on the plurality of service requests and the plurality of service responses.

20 Claims, 7 Drawing Sheets

(51) Int. Cl.
  *H04L 67/02* (2022.01)
  *G06V 40/12* (2022.01)
  *G06Q 20/40* (2012.01)

(56) References Cited

U.S. PATENT DOCUMENTS

| | | |
|---|---|---|
| 2015/0074809 A1 | 3/2015 | Thomas et al. |
| 2015/0121529 A1* | 4/2015 | Quinlan .................. H04L 67/28 726/23 |
| 2016/0125412 A1 | 5/2016 | Cannon |
| 2019/0020680 A1 | 1/2019 | Khalimonenko et al. |
| 2019/0087495 A1 | 3/2019 | Salusky et al. |

OTHER PUBLICATIONS

Husak et al., "HTTPS traffic analysis and client identification using passive SSL/TLS fingerprinting", EURASIP Journal on Information Security, 2016, pp. 1-14.

Yadav, "Ensuring the Security of Your APIs", DZone, 2019, pp. 1-16, https://dzone.com/articles/how-do-you-ensure-security.

* cited by examiner

METHOD, SYSTEM, AND COMPUTER PROGRAM PRODUCT FOR IDENTIFYING A MALICIOUS USER

CROSS REFERENCE TO RELATED APPLICATIONS

This application claims priority to U.S. Provisional Patent Application No. 62/848,191, filed on May 15, 2019, the disclosure of which is incorporated by reference herein in its entirety.

BACKGROUND

1. Field

This disclosure relates generally to systems, devices, products, apparatus, and methods that are used for identifying and/or preventing guessing and/or validation attacks in open networks, and in some embodiments or aspects, to a method, a system, and a product for identifying a malicious user.

2. Technical Considerations

Many merchants are establishing themselves online and allowing online purchases with credit cards. Quite frequently, such eCommerce sites offer a "frictionless" experience (e.g., guest checkout, etc.) and perform minimal cardholder authentication or no authentication at all. Existing technology enables a malicious user to script a checkout process "walkthrough" and use bots to invoke the checkout process multiple times with the purpose of guessing card authorization data (e.g., PAN, CVV, expiration date, etc.) and/or validating cardholder data sourced on the black market (e.g., sourced from hacking, etc.).

Although merchants are adding required authorization (e.g., information that enables detecting that a service request was "enriched" with merchant credentials, but that does not ensure that the merchant performed any cardholder validation, etc.) to requests that redirect cardholders to payment processing services, there is no guarantee that the merchants are properly securing processing flows and/or data. For example, merchants provided with outsourced payment processing (e.g., including capture of sensitive data, etc.) may not pay sufficient attention to ensure a secure integration with the payment processing services (e.g., due to false assumptions, etc.) and/or may lack relevant technical knowledge/experience to do so. Further, with the relatively large number of merchants integrating with payment processing services, a significant probability exists that some merchants may not integrate according to best practices desired or required by the payment processing services, thereby directly and/or indirectly compromising the security of processing flows and/or data for themselves and/or the payment processing services. For example, attacks may be mounted against a transaction service provider system using a merchant's infrastructure (e.g., servers, APIs, etc.) to generate valid (e.g., in terms of authorization, etc.) service requests to the transaction service provider system. As an example, such requests may be filled with bogus data and/or aimed at facilitating card guessing (e.g., trying all possible combinations of a CVV and expiration date against a random card number that passes a Luhn check, etc.) or card validation (e.g., checking if payment credentials sourced from the black market are still valid or not restricted, etc.). In such an example, if an online checkout for a merchant includes a single webpage that can be accessed by a user without the user passing any security checks implemented by the merchant (e.g., no session-id, no CSFR token, no rate limiting, etc.), such a webpage may be used by a malicious user to generate valid secure acceptance requests, such that, for the purpose of the malicious user or attacker, having the ability to sign arbitrary data is no different than having direct access to the merchant key. In other words, the merchant signing key may be effectively, although not literally, compromised.

Accordingly, there is a need for improved identification of malicious users in networks.

SUMMARY

Accordingly, provided are improved systems, devices, products, apparatus, and/or methods for identifying a malicious user.

According to some non-limiting embodiments or aspects, provided is a computer-implemented method for identifying a malicious user, including: obtaining, with at least one processor, a plurality of service requests for a service provided by a processing system, wherein each service request of the plurality of service requests is associated with a requesting user and a requesting system, and a plurality of service responses associated with the plurality of service requests, wherein each service response of the plurality of service responses is associated with the processing system; and identifying, with at least one processor, the requesting user as malicious based on the plurality of service requests and the plurality of service responses.

In some non-limiting embodiments or aspects, the method further includes providing, with at least one processor, the plurality of service requests to the processing system; and receiving, with at least one processor, the plurality of service responses from the processing system.

In some non-limiting embodiments or aspects, the method further includes receiving, with at least one processor, at least one further service request from the requesting user; based on identifying the requesting user as malicious, at least one of flagging and blocking, with at least one processor, the at least one further service request.

In some non-limiting embodiments or aspects, each service response of the plurality of service responses includes response data associated with an acceptance or a denial of the service at the processing system inserted as a header value in a HyperText Transfer Protocol (HTTP) response of that service response.

In some non-limiting embodiments or aspects, the method further includes modifying, with at least one processor, the plurality of service responses by removing the response data associated with the acceptance or the denial of the service for each service response inserted as the header value in the HTTP response of that service response; and providing, with at least one processor, the plurality of modified service responses to the requesting user.

In some non-limiting embodiments or aspects, the method further includes receiving, with at least one processor, the plurality of service requests from the requesting system; and generating, with at least one processor, the plurality of service responses.

In some non-limiting embodiments or aspects, the method further includes receiving, with at least one processor, at least one further service request associated with the requesting user from the requesting system; and in response to receiving the at least one further service request, providing, with at least one processor, an indication that the requesting user is malicious to the requesting system.

In some non-limiting embodiments or aspects, the indication that the requesting user is malicious includes a HyperText Transfer Protocol (HTTP) response.

In some non-limiting embodiments or aspects, each service response of the plurality of service responses is associated with an acceptance or a denial of the service at the processing system for that service response, and wherein the requesting user is identified as malicious based on at least one threshold and at least one of a number of the acceptances included in the plurality of service responses with respect to a number of the plurality of service requests and a number of the denials included in the plurality of service responses with respect to the number of the plurality of service requests.

In some non-limiting embodiments or aspects, the at least one threshold dynamically changes with respect to at least one parameter associated with the plurality of service requests.

In some non-limiting embodiments or aspects, each service request of the plurality of service requests is received by the requesting system within a first time period, and wherein the requesting user is identified as malicious within a second time period after the first time period.

In some non-limiting embodiments or aspects, the method further includes obtaining, with at least one processor, within the second time period, a further service request for the service provided by the processing system, wherein the further service request is associated with the requesting user and the requesting system; and automatically denying, with at least one processor, the further service request.

In some non-limiting embodiments or aspects, the method further includes obtaining, with at least one processor, another service request for the service provided by the processing system, wherein the another service request is a first service request received at the requesting system from the requesting user after expiration of the second time period; obtaining, with at least one processor, another service response associated with the another service request, wherein the another service response is associated with an acceptance or a denial of the service at the processing system; and determining, with at least one processor, whether to continue to identify the requesting user as malicious according to the acceptance or the denial of the service at the processing system.

In some non-limiting embodiments or aspects, the method further includes determining, with at least one processor, a fingerprint associated with the requesting user based on a first service request of the plurality of service requests; determining, with at least one processor, a further fingerprint based on a further service request; and determining, with at least one processor, that the further service request is associated with the same requesting user based on the fingerprint and the further fingerprint.

In some non-limiting embodiments or aspects, the service provided by the processing system includes a transaction authorization service, and wherein the plurality of service requests includes a plurality of transaction authorization service requests associated with a plurality of transactions between the requesting user and the requesting system.

In some non-limiting embodiments or aspects, the method further includes in response to identifying the requesting user as malicious, implementing, with at least one processor, at least one cyberattack against the requesting user.

According to some non-limiting embodiments or aspects, provided is a computing system for identifying a malicious user, including: one or more processors programmed and/or configured to: obtain a plurality of service requests for a service provided by a processing system, wherein each service request of the plurality of service requests is associated with a requesting user and a requesting system, and a plurality of service responses associated with the plurality of service requests, wherein each service response of the plurality of service responses is associated with the processing system; and identify the requesting user as malicious based on the plurality of service requests and the plurality of service responses.

In some non-limiting embodiments or aspects, the one or more processors are further programmed and/or configured to: provide the plurality of service requests to the processing system; and receive the plurality of service responses from the processing system.

In some non-limiting embodiments or aspects, the one or more processors are further programmed and/or configured to: receive at least one further service request from the requesting user; and based on identifying the requesting user as malicious, at least one of flag and block the at least one further service request.

In some non-limiting embodiments or aspects, each service response of the plurality of service responses includes response data associated with an acceptance or a denial of the service at the processing system inserted as a header value in a HyperText Transfer Protocol (HTTP) response of that service response.

In some non-limiting embodiments or aspects, the one or more processors are further programmed and/or configured to: modify the plurality of service responses by removing the response data associated with the acceptance or the denial of the service for each service response inserted as the header value in the HTTP response of that service response; and provide the plurality of modified service responses to the requesting user.

In some non-limiting embodiments or aspects, the one or more processors are further programmed and/or configured to: receive the plurality of service requests from the requesting system; and generate the plurality of service responses.

In some non-limiting embodiments or aspects, the one or more processors are further programmed and/or configured to: receive at least one further service request associated with the requesting user from the requesting system; and in response to receiving the at least one further service request, provide an indication that the requesting user is malicious to the requesting system.

In some non-limiting embodiments or aspects, the indication that the requesting user is malicious includes a HyperText Transfer Protocol (HTTP) response.

In some non-limiting embodiments or aspects, each service response of the plurality of service responses is associated with an acceptance or a denial of the service at the processing system for that service response, and wherein the requesting user is identified as malicious based on at least one threshold and at least one of a number of the acceptances included in the plurality of service responses with respect to a number of the plurality of service requests and a number of the denials included in the plurality of service responses with respect to the number of the plurality of service requests.

In some non-limiting embodiments or aspects, the at least one threshold dynamically changes with respect to at least one parameter associated with the plurality of service requests.

In some non-limiting embodiments or aspects, each service request of the plurality of service requests is received by the requesting system within a first time period, and wherein the requesting user is identified as malicious within a second time period after the first time period.

In some non-limiting embodiments or aspects, the one or more processors are further programmed and/or configured to: obtain, within the second time period, a further service request for the service provided by the processing system, wherein the further service request is associated with the requesting user and the requesting system; and automatically deny the further service request.

In some non-limiting embodiments or aspects, the one or more processors are further programmed and/or configured to: obtain another service request for the service provided by the processing system, wherein the another service request is a first service request received at the requesting system from the requesting user after expiration of the second time period; obtain another service response associated with the another service request, wherein the another service response is associated with an acceptance or a denial of the service at the processing system; and determine whether to continue to identify the requesting user as malicious according to the acceptance or the denial of the service at the processing system.

In some non-limiting embodiments or aspects, the one or more processors are further programmed and/or configured to: determine a fingerprint associated with the requesting user based on a first service request of the plurality of service requests; determine a further fingerprint based on a further service request; and determine that the further service request is associated with the same requesting user based on the fingerprint and the further fingerprint.

In some non-limiting embodiments or aspects, the service provided by the processing system includes a transaction authorization service, and wherein the plurality of service requests includes a plurality of transaction authorization service requests associated with a plurality of transactions between the requesting user and the requesting system.

In some non-limiting embodiments or aspects, the one or more processors are further programmed and/or configured to: in response to identifying the requesting user as malicious, implement at least one cyberattack against the requesting user.

According to some non-limiting embodiments or aspects, provided is a computer program product including at least one non-transitory computer-readable medium including program instructions that, when executed by at least one processor, cause the at least one processor to: obtain a plurality of service requests for a service provided by a processing system, wherein each service request of the plurality of service requests is associated with a requesting user and a requesting system, and a plurality of service responses associated with the plurality of service requests, wherein each service response of the plurality of service responses is associated with the processing system; and identify the requesting user as malicious based on the plurality of service requests and the plurality of service responses.

In some non-limiting embodiments or aspects, the instructions further cause the at least one processor to: provide the plurality of service requests to the processing system; and receive the plurality of service responses from the processing system.

In some non-limiting embodiments or aspects, the instructions further cause the at least one processor to: receive at least one further service request from the requesting user; based on identifying the requesting user as malicious, at least one of flag and block the at least one further service request.

In some non-limiting embodiments or aspects, each service response of the plurality of service responses includes response data associated with an acceptance or a denial of the service at the processing system inserted as a header value in a HyperText Transfer Protocol (HTTP) response of that service response.

In some non-limiting embodiments or aspects, the instructions further cause the at least one processor to: modify the plurality of service responses by removing the response data associated with the acceptance or the denial of the service for each service response inserted as the header value in the HTTP response of that service response; and provide the plurality of modified service responses to the requesting user.

In some non-limiting embodiments or aspects, the instructions further cause the at least one processor to: receive the plurality of service requests from the requesting system; and generate the plurality of service responses.

In some non-limiting embodiments or aspects, the instructions further cause the at least one processor to: receive at least one further service request associated with the requesting user from the requesting system; and in response to receiving the at least one further service request, provide an indication that the requesting user is malicious to the requesting system.

In some non-limiting embodiments or aspects, the indication that the requesting user is malicious includes a HyperText Transfer Protocol (HTTP) response.

In some non-limiting embodiments or aspects, each service response of the plurality of service responses is associated with an acceptance or a denial of the service at the processing system for that service response, and wherein the requesting user is identified as malicious based on at least one threshold and at least one of a number of the acceptances included in the plurality of service responses with respect to a number of the plurality of service requests and a number of the denials included in the plurality of service responses with respect to the number of the plurality of service requests.

In some non-limiting embodiments or aspects, the at least one threshold dynamically changes with respect to at least one parameter associated with the plurality of service requests.

In some non-limiting embodiments or aspects, each service request of the plurality of service requests is received by the requesting system within a first time period, and wherein the requesting user is identified as malicious within a second time period after the first time period.

In some non-limiting embodiments or aspects, the instructions further cause the at least one processor to: obtain, within the second time period, a further service request for the service provided by the processing system, wherein the further service request is associated with the requesting user and the requesting system; and automatically deny the further service request.

In some non-limiting embodiments or aspects, the instructions further cause the at least one processor to: obtain another service request for the service provided by the processing system, wherein the another service request is a first service request received at the requesting system from the requesting user after expiration of the second time period; obtain another service response associated with the another service request, wherein the another service response is associated with an acceptance or a denial of the service at the processing system; and determine whether to continue to identify the requesting user as malicious according to the acceptance or the denial of the service at the processing system.

In some non-limiting embodiments or aspects, the instructions further cause the at least one processor to: determine a fingerprint associated with the requesting user based on a first service request of the plurality of service requests; determine a further fingerprint based on a further service request; and determine that the further service request is associated with the same requesting user based on the fingerprint and the further fingerprint.

In some non-limiting embodiments or aspects, the service provided by the processing system includes a transaction authorization service, and wherein the plurality of service requests includes a plurality of transaction authorization service requests associated with a plurality of transactions between the requesting user and the requesting system.

In some non-limiting embodiments or aspects, the instructions further cause the at least one processor to: in response to identifying the requesting user as malicious, implement at least one cyberattack against the requesting user.

Further embodiments or aspects are set forth in the following numbered clauses:

Clause 1. A computer-implemented method for identifying a malicious user, comprising: obtaining, with at least one processor, a plurality of service requests for a service provided by a processing system, wherein each service request of the plurality of service requests is associated with a requesting user and a requesting system, and a plurality of service responses associated with the plurality of service requests, wherein each service response of the plurality of service responses is associated with the processing system; and identifying, with at least one processor, the requesting user as malicious based on the plurality of service requests and the plurality of service responses.

Clause 2. The computer-implemented method of clause 1, further comprising: providing, with at least one processor, the plurality of service requests to the processing system; and receiving, with at least one processor, the plurality of service responses from the processing system.

Clause 3. The computer-implemented method of clauses 1 or 2, further comprising: receiving, with at least one processor, at least one further service request from the requesting user; based on identifying the requesting user as malicious, at least one of flagging and blocking, with at least one processor, the at least one further service request.

Clause 4. The computer-implemented method of any of clauses 1-3, wherein each service response of the plurality of service responses includes response data associated with an acceptance or a denial of the service at the processing system inserted as a header value in a HyperText Transfer Protocol (HTTP) response of that service response.

Clause 5. The computer-implemented method of any of clauses 1-4, further comprising: modifying, with at least one processor, the plurality of service responses by removing the response data associated with the acceptance or the denial of the service for each service response inserted as the header value in the HTTP response of that service response; and providing, with at least one processor, the plurality of modified service responses to the requesting user.

Clause 6. The computer-implemented method of any of clauses 1-5, further comprising: receiving, with at least one processor, the plurality of service requests from the requesting system; and generating, with at least one processor, the plurality of service responses.

Clause 7. The computer-implemented method of any of clauses 1-6, further comprising: receiving, with at least one processor, at least one further service request associated with the requesting user from the requesting system; and in response to receiving the at least one further service request, providing, with at least one processor, an indication that the requesting user is malicious to the requesting system.

Clause 8. The computer-implemented method of any of clauses 1-7, wherein the indication that the requesting user is malicious includes a HyperText Transfer Protocol (HTTP) response.

Clause 9. The computer-implemented method of any of clauses 1-8, wherein each service response of the plurality of service responses is associated with an acceptance or a denial of the service at the processing system for that service response, and wherein the requesting user is identified as malicious based on at least one threshold and at least one of a number of the acceptances included in the plurality of service responses with respect to a number of the plurality of service requests and a number of the denials included in the plurality of service responses with respect to the number of the plurality of service requests.

Clause 10. The computer-implemented method of any of clauses 1-9, wherein the at least one threshold dynamically changes with respect to at least one parameter associated with the plurality of service requests.

Clause 11. The computer-implemented method of any of clauses 1-10, wherein each service request of the plurality of service requests is received by the requesting system within a first time period, and wherein the requesting user is identified as malicious within a second time period after the first time period.

Clause 12. The computer-implemented method of any of clauses 1-11, further comprising: obtaining, with at least one processor, within the second time period, a further service request for the service provided by the processing system, wherein the further service request is associated with the requesting user and the requesting system; and automatically denying, with at least one processor, the further service request.

Clause 13. The computer-implemented method of any of clauses 1-12, further comprising: obtaining, with at least one processor, another service request for the service provided by the processing system, wherein the another service request is a first service request received at the requesting system from the requesting user after expiration of the second time period; obtaining, with at least one processor, another service response associated with the another service request, wherein the another service response is associated with an acceptance or a denial of the service at the processing system; and determining, with at least one processor, whether to continue to identify the requesting user as malicious according to the acceptance or the denial of the service at the processing system.

Clause 14. The computer-implemented method of any of clauses 1-13, further comprising: determining, with at least one processor, a fingerprint associated with the requesting user based on a first service request of the plurality of service requests; determining, with at least one processor, a further fingerprint based on a further service request; and determining, with at least one processor, that the further service request is associated with the same requesting user based on the fingerprint and the further fingerprint.

Clause 15. The computer-implemented method of any of clauses 1-14, wherein the service provided by the processing system includes a transaction authorization service, and wherein the plurality of service requests includes a plurality of transaction authorization service requests associated with a plurality of transactions between the requesting user and the requesting system.

Clause 16. The computer-implemented method of any of clauses 1-15, further comprising: in response to identifying the requesting user as malicious, implementing, with at least one processor, at least one cyberattack against the requesting user.

Clause 17. A computing system for identifying a malicious user, comprising: one or more processors programmed and/or configured to: obtain a plurality of service requests for a service provided by a processing system, wherein each service request of the plurality of service requests is associated with a requesting user and a requesting system, and a plurality of service responses associated with the plurality of service requests, wherein each service response of the plurality of service responses is associated with the processing system; and identify the requesting user as malicious based on the plurality of service requests and the plurality of service responses.

Clause 18. The computing system of clause 17, wherein the one or more processors are further programmed and/or configured to: provide the plurality of service requests to the processing system; and receive the plurality of service responses from the processing system.

Clause 19. The computing system of clauses 17 or 18, wherein the one or more processors are further programmed and/or configured to: receive at least one further service request from the requesting user; based on identifying the requesting user as malicious, at least one of flag and block the at least one further service request.

Clause 20. The computing system of any of clauses 17-19, wherein each service response of the plurality of service responses includes response data associated with an acceptance or a denial of the service at the processing system inserted as a header value in a HyperText Transfer Protocol (HTTP) response of that service response.

Clause 21. The computing system of any of clauses 17-20, wherein the one or more processors are further programmed and/or configured to: modify the plurality of service responses by removing the response data associated with the acceptance or the denial of the service for each service response inserted as the header value of the HTTP response of that service response; and provide the plurality of modified service responses to the requesting system.

Clause 22. The computing system of any of clauses 17-21, wherein the one or more processors are further programmed and/or configured to: receive the plurality of service requests from the requesting system; and generate the plurality of service responses.

Clause 23. The computing system of any of clauses 17-22, wherein the one or more processors are further programmed and/or configured to: receive at least one further service request associated with the requesting user from the requesting system; and in response to receiving the at least one further service request, provide an indication that the requesting user is malicious to the requesting system.

Clause 24. The computing system of any of clauses 17-23, wherein the indication that the requesting user is malicious includes a HyperText Transfer Protocol (HTTP) response.

Clause 25. The computing system of any of clauses 17-24, wherein each service response of the plurality of service responses is associated with an acceptance or a denial of the service at the processing system for that service response, and wherein the requesting user is identified as malicious based on at least one threshold and at least one of a number of the acceptances included in the plurality of service responses with respect to a number of the plurality of service requests and a number of the denials included in the plurality of service responses with respect to the number of the plurality of service requests.

Clause 26. The computing system of any of clauses 17-25, wherein the at least one threshold dynamically changes with respect to at least one parameter associated with the plurality of service requests.

Clause 27. The computing system of any of clauses 17-26, wherein each service request of the plurality of service requests is received by the requesting system within a first time period, and wherein the requesting user is identified as malicious within a second time period after the first time period.

Clause 28. The computing system of any of clauses 17-27, wherein the one or more processors are further programmed and/or configured to: obtain, within the second time period, a further service request for the service provided by the processing system, wherein the further service request is associated with the requesting user and the requesting system; and automatically deny the further service request.

Clause 29. The computing system of any of clauses 17-28, wherein the one or more processors are further programmed and/or configured to: obtain another service request for the service provided by the processing system, wherein the another service request is a first service request received at the requesting system from the requesting user after expiration of the second time period; obtain another service response associated with the another service request, wherein the another service response is associated with an acceptance or a denial of the service at the processing system; and determine whether to continue to identify the requesting user as malicious according to the acceptance or the denial of the service at the processing system.

Clause 30. The computing system of any of clauses 17-29, wherein the one or more processors are further programmed and/or configured to: determine a fingerprint associated with the requesting user based on a first service request of the plurality of service requests; determine a further fingerprint based on a further service request; and determine that the further service request is associated with the same requesting user based on the fingerprint and the further fingerprint.

Clause 31. The computing system of any of clauses 17-30, wherein the service provided by the processing system includes a transaction authorization service, and wherein the plurality of service requests includes a plurality of transaction authorization service requests associated with a plurality of transactions between the requesting user and the requesting system.

Clause 32. The computing system of any of clauses 17-31, wherein the one or more processors are further programmed and/or configured to: in response to identifying the requesting user as malicious, implement at least one cyberattack against the requesting user.

Clause 33. A computer program product comprising at least one non-transitory computer-readable medium including program instructions that, when executed by at least one processor, cause the at least one processor to: obtain a plurality of service requests for a service provided by a processing system, wherein each service request of the plurality of service requests is associated with a requesting user and a requesting system, and a plurality of service responses associated with the plurality of service requests, wherein each service response of the plurality of service responses is associated with the processing system; and identify the requesting user as malicious based on the plurality of service requests and the plurality of service responses.

Clause 34. The computer program product of clause 33, wherein the instructions further cause the at least one processor to: provide the plurality of service requests to the processing system; and receive the plurality of service responses from the processing system.

Clause 35. The computer program product of clauses 33 or 34, wherein the instructions further cause the at least one processor to: receive at least one further service request from the requesting user; based on identifying the requesting user as malicious, at least one of flag and block the at least one further service request.

Clause 36. The computer program product of any of clauses 33-35, wherein each service response of the plurality of service responses includes response data associated with an acceptance or a denial of the service at the processing system inserted as a header value of a HyperText Transfer Protocol (HTTP) response of that service response.

Clause 37. The computer program product of any of clauses 33-36, wherein the instructions further cause the at least one processor to: modify the plurality of service responses by removing the response data associated with the acceptance or the denial of the service for each service response inserted as the header value of the HTTP response of that service response; and provide the plurality of modified service responses to the requesting user.

Clause 38. The computer program product of any of clauses 33-37, wherein the instructions further cause the at least one processor to: receive the plurality of service requests from the requesting system; and generate the plurality of service responses.

Clause 39. The computer program product of any of clauses 33-38, wherein the instructions further cause the at least one processor to: receive at least one further service request associated with the requesting user from the requesting system; and in response to receiving the at least one further service request, provide an indication that the requesting user is malicious to the requesting system.

Clause 40. The computer program product of any of clauses 33-39, wherein the indication that the requesting user is malicious includes a HyperText Transfer Protocol (HTTP) response.

Clause 41. The computer program product of any of clauses 33-40, wherein each service response of the plurality of service responses is associated with an acceptance or a denial of the service at the processing system for that service response, and wherein the requesting user is identified as malicious based on at least one threshold and at least one of a number of the acceptances included in the plurality of service responses with respect to a number of the plurality of service requests and a number of the denials included in the plurality of service responses with respect to the number of the plurality of service requests.

Clause 42. The computer program product of any of clauses 33-41, wherein the at least one threshold dynamically changes with respect to at least one parameter associated with the plurality of service requests.

Clause 43. The computer program product of any of clauses 33-42, wherein each service request of the plurality of service requests is received by the requesting system within a first time period, and wherein the requesting user is identified as malicious within a second time period after the first time period.

Clause 44. The computer program product of any of clauses 33-43, wherein the instructions further cause the at least one processor to: obtain, within the second time period, a further service request for the service provided by the processing system, wherein the further service request is associated with the requesting user and the requesting system; and automatically deny the further service request.

Clause 45. The computer program product of any of clauses 33-44, wherein the instructions further cause the at least one processor to: obtain another service request for the service provided by the processing system, wherein the another service request is a first service request received at the requesting system from the requesting user after expiration of the second time period; obtain another service response associated with the another service request, wherein the another service response is associated with an acceptance or a denial of the service at the processing system; and determine whether to continue to identify the requesting user as malicious according to the acceptance or the denial of the service at the processing system.

Clause 46. The computer program product of any of clauses 33-45, wherein the instructions further cause the at least one processor to: determine a fingerprint associated with the requesting user based on a first service request of the plurality of service requests; determine a further fingerprint based on a further service request; and determine that the further service request is associated with the same requesting user based on the fingerprint and the further fingerprint.

Clause 47. The computer program product of any of clauses 33-46, wherein the service provided by the processing system includes a transaction authorization service, and wherein the plurality of service requests includes a plurality of transaction authorization service requests associated with a plurality of transactions between the requesting user and the requesting system.

Clause 48. The computer program product of any of 33-47, wherein the instructions further cause the at least one processor to: in response to identifying the requesting user as malicious, implement at least one cyberattack against the requesting user.

Clause 49. A computer-implemented method for identifying a malicious user, comprising: obtaining, with at least one processor, a plurality of service requests for a service provided by a processing system, wherein each service request of the plurality of service requests is associated with a requesting user and a requesting system; providing, with at least one processor, the plurality of service requests to the processing system; receiving, with at least one processor, from the processing system, a plurality of service responses associated with the plurality of service requests, wherein each service response of the plurality of service responses includes response data associated with an acceptance or a denial of the service at the processing system inserted as a header value in a HyperText Transfer Protocol (HTTP) response of that service response; and identifying, with at least one processor, the requesting user as malicious based on the plurality of service requests and the plurality of service responses.

Clause 50. The computer-implemented method of clause 49, further comprising: receiving, with at least one processor, at least one further service request from the requesting user; and based on identifying the requesting user as malicious, at least one of flagging and blocking, with at least one processor, the at least one further service request.

Clause 51. The computer-implemented method of clauses 49 or 50, further comprising: modifying, with at least one processor, the plurality of service responses by removing the response data associated with the acceptance or the denial of the service for each service response inserted as the header value in the HTTP response of that service response; and providing, with at least one processor, the plurality of modified service responses to the requesting user.

Clause 52. The computer-implemented method of any of clauses 49-51, further comprising: receiving, with at least one processor, the plurality of service requests from the requesting system; and generating, with at least one processor, the plurality of service responses.

Clause 53. The computer-implemented method of any of clauses 49-52, further comprising: receiving, with at least one processor, at least one further service request associated with the requesting user from the requesting system; and in response to receiving the at least one further service request, providing, with at least one processor, an indication that the requesting user is malicious to the requesting system.

Clause 54. The computer-implemented method of any of clauses 49-53, wherein the indication that the requesting user is malicious includes a HyperText Transfer Protocol (HTTP) response.

Clause 55. The computer-implemented method of any of clauses 49-54, wherein the requesting user is identified as malicious based on at least one threshold and at least one of a number of the acceptances included in the plurality of service responses with respect to a number of the plurality of service requests and a number of the denials included in the plurality of service responses with respect to the number of the plurality of service requests.

Clause 56. The computer-implemented method of any of clauses 49-55, wherein the at least one threshold dynamically changes with respect to at least one parameter associated with the plurality of service requests.

Clause 57. The computer-implemented method of any of clauses 49-56, wherein each service request of the plurality of service requests is received by the requesting system within a first time period, and wherein the requesting user is identified as malicious within a second time period after the first time period.

Clause 58. The computer-implemented method of any of clauses 49-57, further comprising: obtaining, with at least one processor, within the second time period, a further service request for the service provided by the processing system, wherein the further service request is associated with the requesting user and the requesting system; and automatically denying, with at least one processor, the further service request.

Clause 59. The computer-implemented method of any of clauses 49-58, further comprising: obtaining, with at least one processor, another service request for the service provided by the processing system, wherein the another service request is a first service request received at the requesting system from the requesting user after expiration of the second time period; obtaining, with at least one processor, another service response associated with the another service request, wherein the another service response is associated with an acceptance or a denial of the service at the processing system; and determining, with at least one processor, whether to continue to identify the requesting user as malicious according to the acceptance or the denial of the service at the processing system.

Clause 60. The computer-implemented method of any of clauses 49-59, further comprising: determining, with at least one processor, a fingerprint associated with the requesting user based on a first service request of the plurality of service requests; determining, with at least one processor, a further fingerprint based on a further service request; and determining, with at least one processor, that the further service request is associated with the same requesting user based on the fingerprint and the further fingerprint.

Clause 61. The computer-implemented method of any of clauses 49-60, wherein the service provided by the processing system includes a transaction authorization service, and wherein the plurality of service requests includes a plurality of transaction authorization service requests associated with a plurality of transactions between the requesting user and the requesting system.

Clause 62. The computer-implemented method of any of clauses 49-61, further comprising: in response to identifying the requesting user as malicious, implementing, with at least one processor, at least one cyberattack against the requesting user.

Clause 63. A computing system for identifying a malicious user, comprising: one or more processors programmed and/or configured to: obtain a plurality of service requests for a service provided by a processing system, wherein each service request of the plurality of service requests is associated with a requesting user and a requesting system; provide the plurality of service requests to the processing system; receive from the processing system, a plurality of service responses associated with the plurality of service requests, wherein each service response of the plurality of service responses includes response data associated with an acceptance or a denial of the service at the processing system inserted as a header value in a HyperText Transfer Protocol (HTTP) response of that service response; and identify the requesting user as malicious based on the plurality of service requests and the plurality of service responses.

Clause 64. The computing system of clause 63, wherein the one or more processors are further programmed and/or configured to: receive at least one further service request from the requesting user; and based on identifying the requesting user as malicious, at least one of flag and block the at least one further service request.

Clause 65. The computing system of clauses 63 or 64, wherein the one or more processors are further programmed and/or configured to: modify the plurality of service responses by removing the response data associated with the acceptance or the denial of the service for each service response inserted as the header value in the HTTP response of that service response; and provide the plurality of modified service responses to the requesting user.

Clause 66. A computer program product comprising at least one non-transitory computer-readable medium including program instructions that, when executed by at least one processor, cause the at least one processor to: obtain a plurality of service requests for a service provided by a processing system, wherein each service request of the plurality of service requests is associated with a requesting user and a requesting system; provide the plurality of service requests to the processing system; receive from the processing system, a plurality of service responses associated with the plurality of service requests, wherein each service response of the plurality of service responses includes response data associated with an acceptance or a denial of the service at the processing system inserted as a header value in a HyperText Transfer Protocol (HTTP) response of that service response; and identify the requesting user as malicious based on the plurality of service requests and the plurality of service responses.

Clause 67. The computer program product of clause 66, wherein the instructions further cause the at least one processor to: receive at least one further service request from the requesting user; and based on identifying the requesting user as malicious, at least one of flag and block the at least one further service request.

Clause 68. The computer program product of clauses 66 or 67, wherein the instructions further cause the at least one processor to: modify the plurality of service responses by removing the response data associated with the acceptance or the denial of the service for each service response inserted as the header value in the HTTP response of that service response; and provide the plurality of modified service responses to the requesting user.

Clause 69. A computing system for identifying a malicious user, comprising: one or more processors programmed and/or configured to perform the method according to any of clauses 49-62.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments or aspects that are illustrated in the accompanying schematic figures, in which.

DESCRIPTION

Figure 1A:
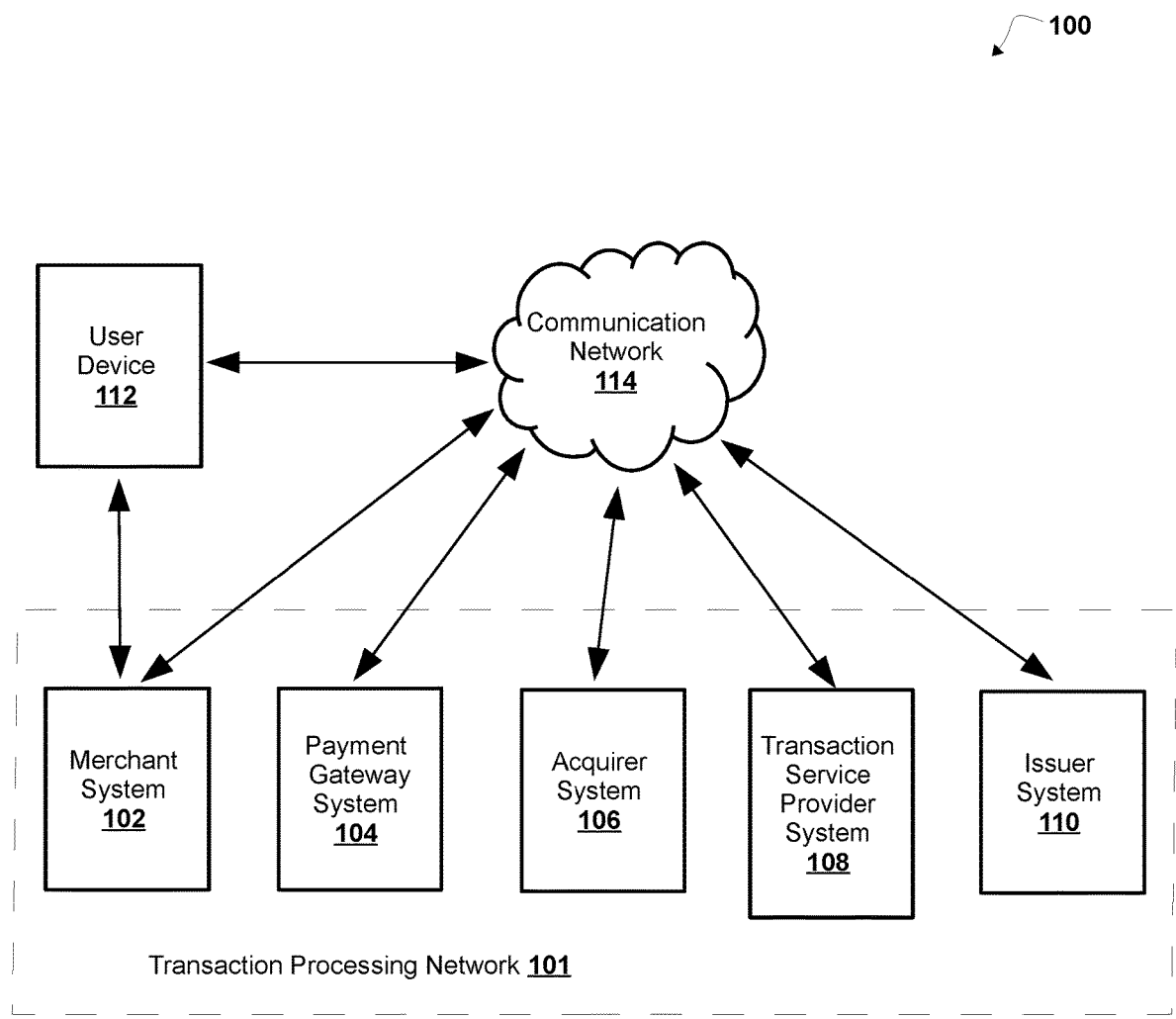
FIG. 1A is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a PAN, to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides goods and/or services, or access to goods and/or services, to users (e.g. customers) based on a transaction (e.g. a payment transaction). As used herein, the terms "merchant" or "merchant system" may also refer to one or more computer systems, computing devices, and/or software application operated by or on behalf of a merchant, such as a server computer executing one or more software applications. A "point-of-sale (POS) system," as used herein, may refer to one or more computers and/or peripheral devices used by a merchant to engage in payment transactions with users, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction. A POS system may be part of a merchant system. A merchant system may also include a merchant plug-in for facilitating online, Internet-based transactions through a merchant webpage or software application. A merchant plug-in may include software that runs on a merchant server or is hosted by a third-party for facilitating such online transactions.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "payment device" may refer to a portable financial device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments or aspects, the payment device may include volatile or nonvolatile memory to store information (e.g., an account identifier, a name of the account holder, and/or the like).

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

Provided are improved systems, devices, products, apparatus, and/or methods for identifying a malicious user.

Existing systems for identifying malicious users may be implemented solely on a network level (e.g., a firewall, a web application firewall (WAF), Network Level Authentication, etc.). For example, existing browser-based internet flows (e.g., "Browser-based integration", etc.) use responses to service requests that are essentially successful HyperText Transfer Protocol (HTTP) 200 OK standard responses for successful HTTP requests regardless of whether a request for a service is successful (e.g., accepted by a processing system, authorized by a processing system, etc.) or unsuccessful (e.g., declined by a processing system, indicated as an error by a processing system, etc.). As an example, existing requesting systems or servers would have to perform complex and resource intensive processing of a service response to determine a result of a service request from the service response (e.g., processing which uses an understanding of service protocols that would bloat processing of the service response beyond a reasonable or acceptable level, etc.). In this way, existing systems for identifying a malicious user do not have a mechanism to identify a user as malicious based on abstracted and/or anonymized results of service requests for one or more services provided by a processing system.

Non-limiting embodiments or aspects of the present disclosure are directed to systems, methods, and computer program products for identifying a malicious user that obtain a plurality of service requests for a service provided by a processing system, wherein each service request of the plurality of service requests is associated with a requesting user and a requesting system; provide the plurality of service requests to the processing system; receive, from the processing system, a plurality of service responses associated with the plurality of service requests, wherein each service response of the plurality of service responses includes response data associated with an acceptance or a denial of the service at the processing system inserted as a header value in a HyperText Transfer Protocol (HTTP) response of that service response; and identify the requesting user as malicious based on the plurality of service requests and the plurality of service responses.

Accordingly, information may be aggregated at a requesting system or server level, which enables detection of irregularities and/or malicious users at a relatively early stage of transaction processing; a malicious user may be identified based on relatively simple statistics with greater confidence and lower false positive ratios to improve secure acceptance performance; data may be aggregated from multiple downstream processing systems (e.g., from multiple transaction processing servers, etc.); a service response may be modified to include a result of a service request without blocking legitimate requesting users and impeding flows from requesting systems (e.g., a standardized manner for a transaction service provider system to communicate a transaction result to an API gateway to facilitate malicious request detection may be provided, etc.); more effective protection against malicious users that need not be implemented solely on a network level may be provided; a system for identifying users as malicious may be dynamically managed (e.g., via blocking malicious requests, via flagging malicious requests without blocking the malicious requests, via turning off the system without otherwise affecting processing of service requests, etc.); and/or the like. In this way, non-limiting embodiments or aspects of the present disclosure provide for identifying a user as malicious based on anonymized results of service requests for one or more services provided by a processing system.

Referring now to FIG. 1A, FIG. 1A is a diagram of an example environment 100 in which devices, systems, methods, and/or products described herein, may be implemented. As shown in FIG. 1A, environment 100 includes transaction processing network 101, which may include merchant system 102, payment gateway system 104, acquirer system 106, transaction service provider system 108, and/or issuer system 110, user device 112, and/or communication network 114. Transaction processing network 101, merchant system 102, payment gateway system 104, acquirer system 106, transaction service provider system 108, issuer system 110, and/or user device 112 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 via communication network 114 and/or communicating information and/or data to payment gateway system 104, acquirer system 106, transaction service provider system 108, issuer system 110, and/or user device 112 via communication network 114. Merchant system 102 may include a device capable of receiving information and/or data from user device 112 via a communication connection (e.g., an NFC communication connection, an RFID communication connection, a Bluetooth® communication connection, etc.) with user device 112, and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, and/or user device 112 via communication network 114 and/or communicating information and/or data to merchant system 102, acquirer system 106, transaction service provider system 108, issuer system 110, and/or user device 112 via communication network 114. For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 via communication network 114 and/or communicating information and/or data to merchant system 102, payment gateway system 104, transaction service provider system 108, issuer system 110, and/or user device 112 via communication network 114. For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 via communication network 114 and/or communicating information and/or data to merchant system 102, payment gateway system 104, acquirer system 106, issuer system 110, and/or user device 112 via communication network 114. For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider 108 may include and/or access one or more one or more internal and/or external databases including transaction data.

Issuer system 110 may include one or more devices capable of receiving information and/or data from merchant system 102, payment gateway system 104, acquirer system 106, transaction service provider system 108, and/or user device 112 via communication network 114 and/or communicating information and/or data to merchant system 102, payment gateway system 104, acquirer system 106, transaction service provider system 108, and/or user device 112 via communication network 114. For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 via communication network 114 and/or communicating information and/or data to merchant system 102, payment gateway system 104, acquirer system 106, transaction service provider system 108, and/or issuer system 110 via communication network 114. For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, a peer-to-peer payment transfer application, and/or the like) stored and/or executed on user device 112. In some non-limiting embodiments or aspects, user device 112 may include requesting user device 151.

Communication network 114 may include one or more wired and/or wireless networks. For example, communication network 114 may include a cellular network (e.g., along-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

Figure 1B:
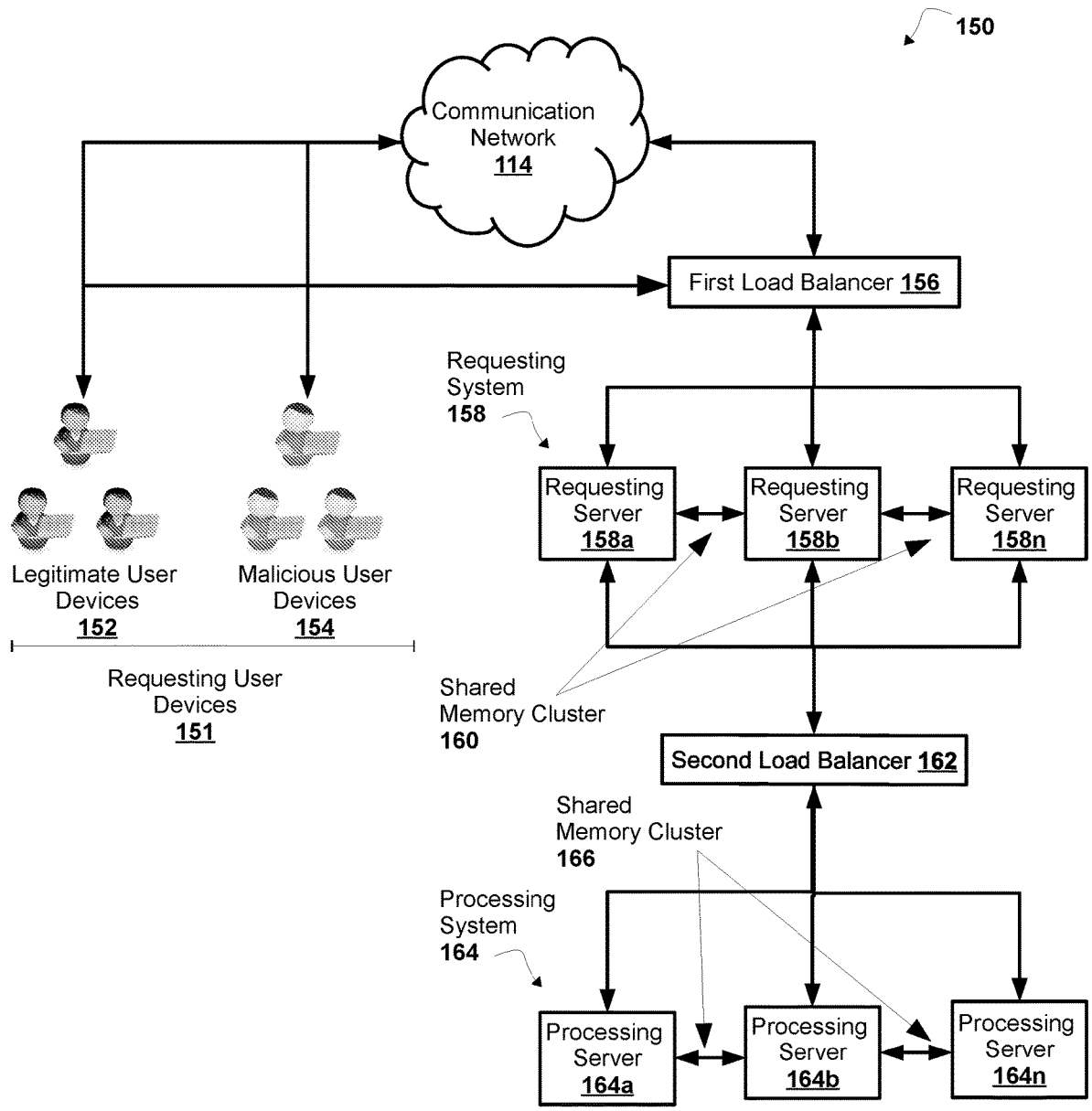
FIG. 1B is a diagram of non-limiting embodiments or aspects of a system for identifying a malicious user.

FIG. 1B is a diagram of an implementation of non-limiting embodiments or aspects of a system 150 for identifying a malicious user. As shown in FIG. 1B, a system 150 identifying a malicious user may include requesting user device 151 (e.g., one or more legitimate user devices 152, one or more malicious user devices 154, user device 112, etc.) communication network 114, a first load balancer 156, requesting system 158 (e.g., one or more requesting servers 158a, 158b, . . . 158n, such as one or API gateways acting as a forward proxy to processing system 164, and/or the like, one or more payment gateway servers of payment gateway system 104, and/or the like, etc.), a shared memory/cluster 160, a second load balancer 162, and/or processing system 164 (e.g., one or more processing servers 164a, 164b, . . . 164n, such as one or more transaction processing servers of transaction service provider system 108, and/or the like, etc.). The first load balancer 156 and the second load balancer 162 are optional components.

Requesting user device 151 (e.g., one or more legitimate user devices 152, one or more malicious user devices 154, etc.) may attempt to call processing services provided by processing system 164 (e.g., provided by the one or more processing servers 164a, 164b, . . . 164n, etc.) at requesting system 158 (e.g., at the one or more requesting servers 158a, 158b, . . . 158n, etc.) via communication network 114 (e.g., via the Internet, etc.) and/or directly via transaction processing network 101. First load balancer 156 may distribute the service calls from the one or more legitimate user devices 152 and the one or more malicious user devices 154 across the one or more requesting servers 158a, 158b, . . . 158n. For example, requesting server 158 (e.g., an API gateway, payment gateway system 104, etc.) may be redundant and include multiple instances of API gateways (e.g., API payment gateways, etc.) behind first load balancer 156. Metrics collected at a level of the one or more requesting servers 158a, 158b, . . . 158n may be stored in shared memory cluster 160 (e.g., in an In-Memory Data Grid (IMDG), etc.) and/or another database that enables relatively fast lookups. The one or more requesting servers 158a, 158b, . . . 158n may provide service requests to the one or more processing servers 164a, 164b, . . . 164n via second load balancer 162, which may distribute the service requests from the one or more requesting servers 158a, 158b, . . . 158n across one or more processing servers 164a, 164b, . . . 164n. For example, processing system 164 (e.g., transaction service provider system 108, etc.) may be redundant and include multiple instances of processing servers (e.g., transaction processing servers, etc.) behind second load balancer 162. Metrics collected at a level of the one or more processing servers 164a, 164b, . . . 164n may be stored in shared memory cluster 166 (e.g., in an In-Memory Data Grid (IMDG), etc.) and/or another database that enables relatively fast lookups. The one or more processing servers 164a, 164b, . . . 164n may provide service responses to the service requests received from the one or more requesting servers 158a, 158b, . . . 158n via second load balancer 162, which may distribute the service responses from the one or more processing servers 164a, 164b, . . . 164n across the one or more requesting servers 158a, 158b, . . . 158n. The one or more requesting servers 158a, 158b, . . . 158n may respond to requesting user device 151 based on the service responses to the service requests. For example, requesting system 158 may provide an indication of an acceptance or a denial of a service requested in a service request corresponding to a service response, an indication that a requesting user is a validated cardholder, an indication that a requesting user is malicious, and/or implement a cyberattack (e.g., a denial-of-service (DoS) attack, etc.) against a malicious requesting user device.

The number and arrangement of devices and systems shown in FIGS. 1A and 1B are provided as an example. There may be additional devices and/or systems, fewer devices and/or systems, different devices and/or systems, or differently arranged devices and/or systems than those shown in FIGS. 1A and 1B. Furthermore, two or more devices and/or systems shown in FIGS. 1A and 1B may be implemented within a single device and/or system, or a single device and/or system shown in FIGS. 1A and 1B may be implemented as multiple, distributed devices and/or systems. Additionally, or alternatively, a set of devices and/or systems (e.g., one or more devices or systems) of environment 100 may perform one or more functions described as being performed by another set of devices or systems of environment 100.

Figure 2:
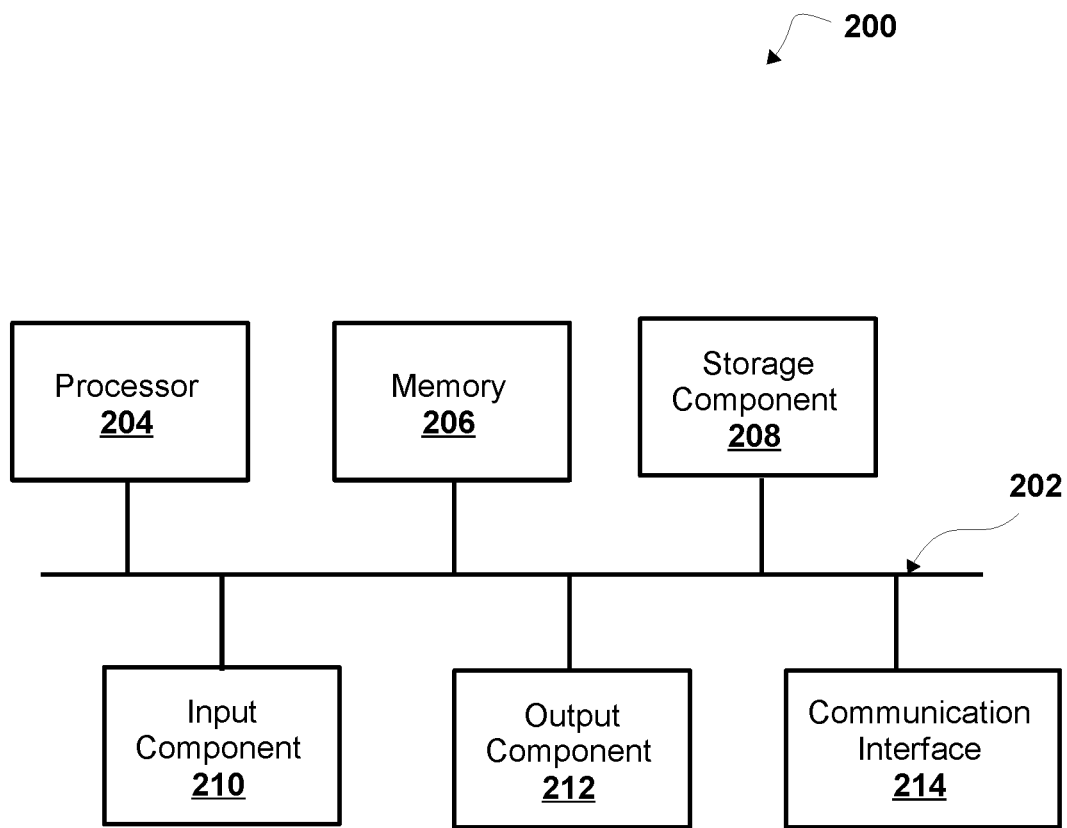
FIG. 2 is a diagram of non-limiting embodiments or aspects of components of one or more devices and/or one or more systems of FIGS. 1A and 1B.

Referring now to FIG. 2, FIG. 2 is a diagram of example components of a device 200. Device 200 may correspond to one or more devices of transaction processing network 101, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), requesting user device 151 (e.g., one or more devices of a system of requesting user device 151, one or more devices of requesting system 158, one or more devices of first load balancer 156, one or more devices of processing system 164, and/or one or more devices of second load balancer 162. In some non-limiting embodiments or aspects, one or more devices of transaction processing network 101, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), requesting user device 151 (e.g., one or more devices of a system of requesting user device 151, one or more devices of requesting system 158, one or more devices of first load balancer 156, one or more devices of processing system 164, and/or one or more devices of second load balancer 162 can include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208. For example, transaction service provider system 108 may include and/or access one or more internal and/or external databases that store transaction data associated with transactions processed and/or being processed in transaction processing network 101 (e.g., prior or historical transactions processed via transaction service provider system 108, etc.).

The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
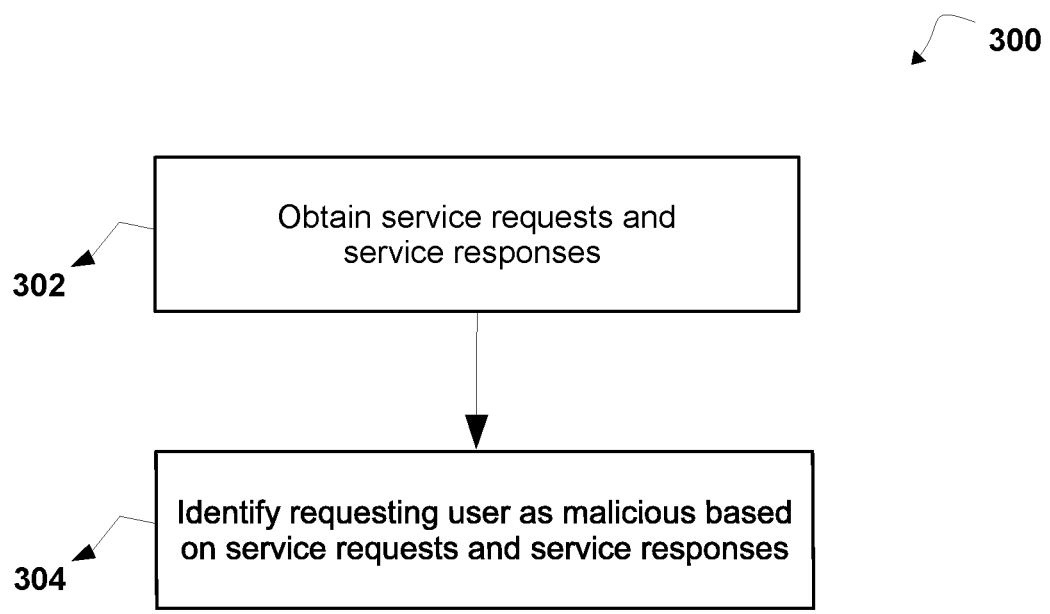
FIG. 3 is a flowchart of non-limiting embodiments or aspects of a process for identifying a malicious user.

Referring now to FIG. 3, FIG. 3 is a flowchart of non-limiting embodiments or aspects of a process 300 for identifying a malicious user. In some non-limiting embodiments or aspects, one or more of the steps of process 300 may be performed (e.g., completely, partially, etc.) by processing system 164 (e.g., one or more processing servers 164a, 164b, . . . 164n of processing system 164, one or more devices of transaction service provider system 108, etc.). In some non-limiting embodiments or aspects, one or more of the steps of process 300 may be performed (e.g., completely, partially, etc.) by another device or a group of devices separate from or including the processing system 164, such as requesting system 158 (e.g., one or more requesting servers 158a, 158b, . . . 158n of requesting system 158, such as one or more API gateways acting as a forward proxy to processing system 164, one or more devices of payment gateway system 104, etc.), merchant system 102 (e.g., one or more devices of merchant system 102), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 3, at step 302, process 300 includes obtaining service requests and service responses. For example, processing system 164 may obtain service requests and service responses. As an example, processing system 164 (e.g., transaction service provider system 108, etc.) may obtain a plurality of service requests for a service provided by processing system 164, wherein each service request of the plurality of service requests is associated with a requesting user (e.g., requesting user devices 151, etc.) and requesting system 158, and a plurality of service responses associated with the plurality of service requests, wherein each service response of the plurality of service responses is associated with processing system 164.

In some non-limiting embodiments or aspects, a service response is associated with an acceptance or a denial of the service at processing system 164 for that service response (e.g., an acceptance or a denial of a service request corresponding to that service response, etc.). For example, each service response of the plurality of service responses may be associated with an acceptance or a denial of the service at processing system 164 for that service response. In some non-limiting embodiments or aspects, the service provided by processing system 164 includes a transaction authorization service, and the plurality of service requests includes a plurality of transaction authorization service requests associated with a plurality of transactions between the requesting user and the requesting system. Additionally, or alternatively, the service provided by processing system 164 may include an email service, a database service, and/or other like data processing services.

In some non-limiting embodiments or aspects, requesting system 158 (e.g., an API gateway, payment gateway system 104, etc.) provide the plurality of service requests to processing system 164 (e.g., transaction service provider system 108, etc.), and requesting system 158 receives the plurality of service responses from processing system 164. For example, requesting system 158 may identify requesting user device 151 associated with a service request as malicious at a relatively early stage of processing based on the plurality of service requests and the plurality of service responses corresponding to requesting user device 151, which may be received from processing system 164. As an example, requesting system 158 may determine service status (e.g., transaction status, etc.) by inspecting service responses from processing system 164.

In such an example, a new protocol between requesting system 158 (e.g., an API gateway, payment gateway system 104, etc.) and processing system 164 (e.g., transaction service provider system 108, etc.) may be established, and the new protocol may leverage new (e.g., custom, modified, etc.) HTTP headers to pass abstracted and/or anonymized information about each service request (e.g., about each transaction, etc.). For example, requesting system 158 may aggregate data, such as success/fail or accept/deny metrics from multiple downstream processing servers 164*a*, 164*b*, . . . 164*n* (e.g., at shared memory cluster 160 at an API gateway, at reverse proxies or similar network appliances, etc.) for one or more services provided by the downstream processing servers 164*a*, 164*b*, . . . 164*n* (e.g., a transaction processing service, etc.).

In some non-limiting embodiments or aspects, a service response may include response data associated with an acceptance or a denial of the service at processing system 164 (e.g., at transaction service provider system 108, etc.) inserted as a header value in a HTTP response of that service response (e.g., a value inserted in a header of a successful HTTP 2xx status response code of that service response, a value inserted in a header of a successful HTTP 4xx status response code of that service response, a value inserted in a header of a successful HTTP 5xx status response code of that service response, etc.). For example, processing system 164 may generate a service response in response to a service request received from requesting system 158, and the service response may include response data associated with an acceptance or a denial of the service at the one or more processing servers 164*a*, 164*b*, . . . 164*n* inserted in a header of a HTTP 200 OK success status response code of the service response. As an example, the response data may be inserted in a new or modified HTTP header that may be (i) injected by a processing server or system into relevant responses (e.g. into a final response that ends a service (e.g., a transaction, etc.) or an error message response—when service (e.g., a transaction, etc.) outcome is known, etc.); (ii) removed by a requesting server or system when the service response passes through the requesting server or system to be delivered to a requesting user; (iii) if present, carries information and/or data about transaction status (e.g. ACCEPT, DECLINE, etc.); abstracts the information about transaction status/result from HTTP status code returned; and/or the like. In such an example, each service response of the plurality of service responses may include response data associated with an acceptance or a denial of the service at processing system 164 inserted in a header of a HTTP 200 OK success status response code of that service response. In such an example, when outsourcing a payment platform, requesting system 158 may always positively respond to requesting user device 151 by using HTTP headers to convey messages about true outcome between requesting system 158 and processing system 164.

In some non-limiting embodiments or aspects, a result or response data may be represented as "v-c-transaction-status" in an HTTP 200 OK success status response code of the service response as follows:

```
HTTP/1.1 200 OK
Server: secretServer
Connection: keep-alive
Date: Fri, 08 Mar 2019 10:25:12 GMT
v-c-correlation-id: 9af33283-aa4f-432e-b582-7314b6b00707
v-c-transaction-status: DECLINE
Content-Type: [application/json;charset=UTF-8]
{"response":"payload"}
```

In some non-limiting embodiments or aspects, requesting system 158 modifies a service response by removing the response data associated with the acceptance or the denial of the service for the service response inserted as the header value of the HTTP response of the service response, and requesting system 158 provides the modified service response to requesting user device 151. For example, requesting system 158 may modify the plurality of service responses by removing the response data associated with the acceptance or the denial of the service for each service response inserted as the header value of the HTTP response of that service response, and provide the plurality of modified service responses to requesting user device 151.

In some non-limiting embodiments or aspects, processing system 164 (e.g., transaction service provider system 108, etc.) receives the plurality of requests from requesting system 158, and processing system 164 generates the plurality of service responses. However, processing system 164 may not include or insert response data associated with an acceptance or a denial of the service at the one or more processing servers 164*a*, 164*b*, . . . 164*n* as a header value in a HTTP response of the service response. For example, processing system 164 may identify whether a requesting user is a malicious user and, if the requesting user is not a malicious user, provide an unmodified service response (e.g., an unmodified HTTP 200 OK success status response code, etc.) to requesting system 158 in response to a service request that is determined to be associated with a requesting user device that is not malicious. As an example, if requesting user device 151 is identified as malicious, processing system 164 may provide an indication that the requesting user is malicious to requesting system 158. In such an example, the indication that the requesting user is malicious may include a HTTP response (e.g., a HTTP 4xx response status code, such as a HTTP 401 Not Authorized response status code, a HTTP 404 Not Found response status code, and/or the like, a HTTP 5xx response status code, etc.). For example, when flagging and/or blocking a requesting user identified as malicious, requesting system 158 need not response to the requesting user in an informative manner, and may attempt to confuse the requesting user. As an example, requesting system 158 may response with a HTTP 200 response status code and pass information (e.g., via a chain of redirections, etc.) to a merchant indicating that a transaction was declined due to "card enumeration" and/or the like, which may include use a cooperating merchant and/or provide information to a malicious user that the malicious user was caught attempting malicious activity.

Further details regarding non-limiting embodiments or aspects of step 302 of process 300 are provided below with regard to FIG. 4.

As shown in FIG. 3, at step 304, process 300 includes identifying a requesting user as malicious based on service requests and service responses. For example, processing system 164 (e.g., transaction service provider system 108) may determine a requesting user as malicious based on service requests and service responses. As an example, processing system 164 may identify requesting user device 151 as malicious based on the plurality of service requests and the plurality of service responses.

In some non-limiting embodiments or aspects, requesting user device 151 is identified as malicious based on at least one threshold and at least one of a number of the acceptances included in the plurality of service responses with respect to a number of the plurality of service requests and a number of the denials included in the plurality of service responses with respect to the number of the plurality of service requests. For example, processing system 164 may identify the requesting user as malicious if the number of the plurality of service requests and/or number of the denials included in the plurality of service responses with respect to the number of the plurality of service requests satisfy at least one threshold number and/or at least one threshold ratio. In some non-limiting embodiments or aspects, the at least one threshold dynamically changes with respect to at least one parameter associated with the plurality of service requests. For example, the at least one threshold may dynamically change according to a date, a time of day, a type of merchant (e.g., MCC, etc.) associated with a requesting system, or any combination thereof.

In some non-limiting embodiments or aspects, requesting system 158 and/or processing system 164 may utilize one or more machine learning algorithms to identify requesting user device 151 as malicious. For example, requesting system 158 and/or processing system 164 may provide one or more service responses, as input, to a machine learning model and receive, as output, a prediction as to whether the one or more services responses is associated with a malicious requesting user.

Further details regarding non-limiting embodiments or aspects of step 304 of process 300 are provided below with regard to FIG. 4.

Figure 4:
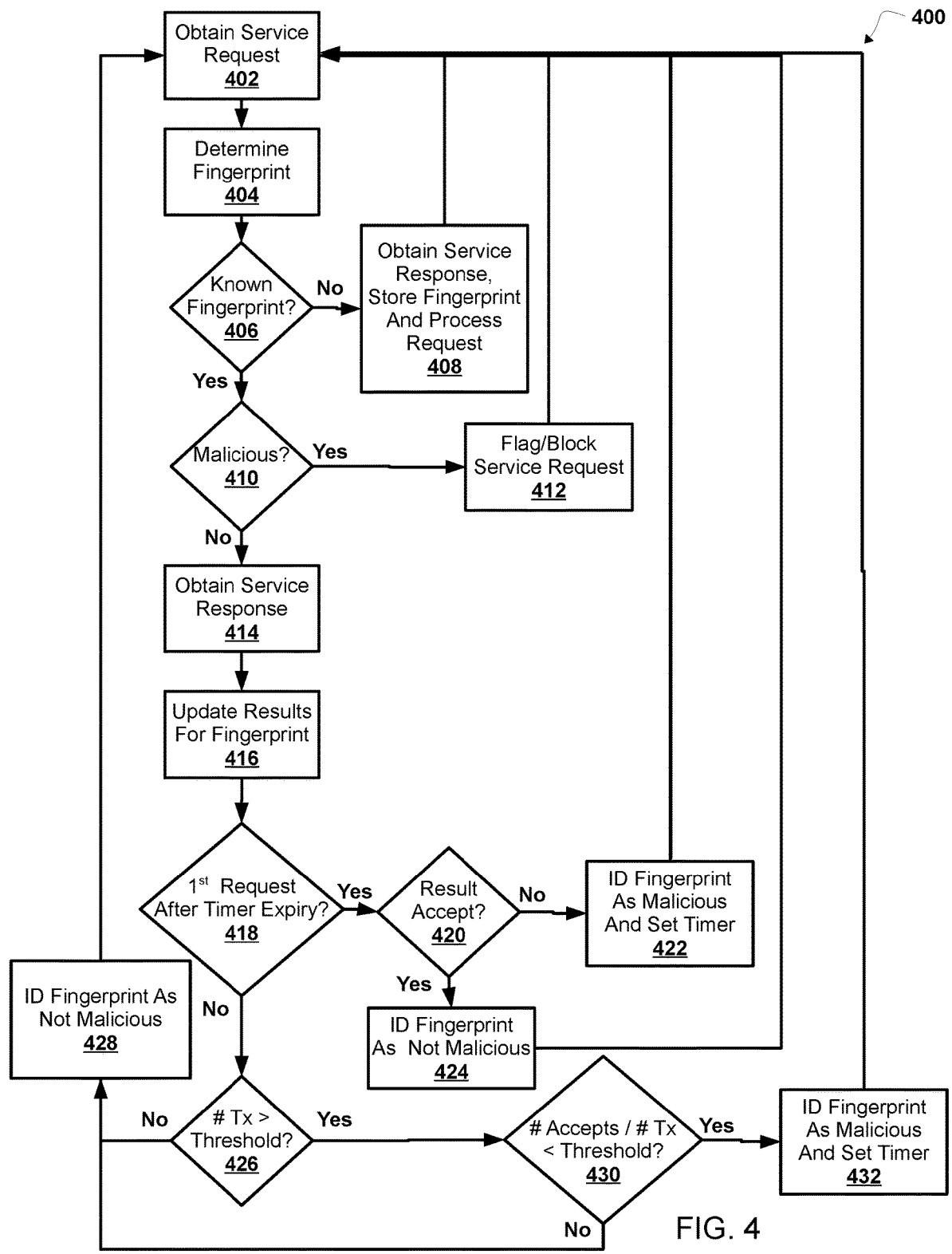
FIG. 4 is a flowchart of non-limiting embodiments or aspects of a process for identifying a malicious user.

Referring now to FIG. 4, FIG. 4 is a flowchart of non-limiting embodiments or aspects of a process 400 for identifying a malicious user. In some non-limiting embodiments or aspects, one or more of the steps of process 400 may be performed (e.g., completely, partially, etc.) by requesting system 158 (e.g., one or more requesting servers 158a, 158b, . . . 158n of requesting system 158, such as one or more API gateways acting as a forward proxy to processing system 164, one or more devices of payment gateway system 104, etc.). In some non-limiting embodiments or aspects, one or more of the steps of process 400 may be performed (e.g., completely, partially, etc.) by another device or a group of devices separate from or including requesting system 158, such as processing system 164 (e.g., one or more processing servers 164a, 164b, . . . 164n of requesting system 164, one or more devices of transaction service provider system 108, etc.), merchant system 102 (e.g., one or more devices of merchant system 102), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 4, at step 402, process 400 includes obtaining a service request. For example, requesting system 158 may obtain a service request. As an example, requesting system 158 may receive a service call from requesting user device 151 and enrich the service call with credentials (e.g., a requesting server identifier, a requesting server access key, a merchant identifier, a merchant access key, such as an equivalent of "API key" and not the actual secret key used for signing, and/or the like, etc.) to generate a service request for a service provided by processing system 164.

In some non-limiting embodiments or aspects, a service request can include one or more parameters associated with requesting user device 151, such as a source IP address, a MAC address, Internet browser history, device type, device capability, device latency or response time, device operating system, user login, another identifier associated with requesting user device 151, or any combination thereof.

In some non-limiting embodiments or aspects, a service request can include transaction data including parameters associated with a transaction, such as an account identifier (e.g., a PAN, etc.), a transaction amount, a transaction date and time, a type of products and/or services associated with the transaction, a conversion rate of currency, a type of currency, a merchant type, a merchant name, a merchant location, and/or the like. For example, a service request may include a request for processing (e.g., for authorization, etc.) of a transaction. As an example, requesting system 158 can receive or determine the transaction data in response to initiation of a transaction at a merchant associated with a requesting system 158 including an API gateway acting as a forward proxy to processing system 164. In such an example, requesting system 158 may receive a service call from requesting user device 151 and receive, determine, and/or generate a service request based on the service call. For example, requesting system 158 may enrich or modify the service call with information or data associated with requesting system 158, and/or the like.

As shown in FIG. 4, at step 404, process 400 includes determining a fingerprint based on a service request. For example, requesting system 158 determines a fingerprint associated with requesting user device 151. As an example, requesting system 158 determines a fingerprint associated with requesting user device 151 based on the service request.

In some non-limiting embodiments or aspects, a fingerprint is determined according to a source IP address of requesting user 151, a unique identifier associated with requesting system 158, an access key associated with requesting system 158, or any combination thereof. For example, requesting system 158 may derive a fingerprint by applying Secure Hash Algorithm (SHA2) to data and/or information included in the service request, such as data and/or information associated with requesting user device 151 and/or associated with merchant integration (e.g., the source IP address, the unique identifier associated with requesting system 158, such as a merchant identifier, and/or the like, the access key, and/or the like, etc.). As an example, requesting system 158 may derive the fingerprint from requesting user device 151 itself (e.g., a device fingerprint, etc.) in combination with a specific software and/or system integration executing on that device (e.g., a specific merchant integration, etc.).

As shown in FIG. 4, at step 406, process 400 includes determining if a fingerprint is a known fingerprint. For example, requesting system 158 determines if a fingerprint is a known fingerprint. As an example, requesting system 158 determines if the fingerprint associated with requesting user device 151 based on the service request matches a previously stored fingerprint stored in a lookup table, a hash map, and/or an in-memory computing platform, such as Hazelcast IMDG, and/or the like. In such an example, the fingerprint may be used as a hash key in a local hash map and/or a distributed hash map.

As shown in FIG. 4, if at step 406 a fingerprint is determined to not be a known fingerprint (e.g., to be an unknown fingerprint, a new fingerprint etc.), at step 408, process 400 includes obtaining a service response for the service request associated with the fingerprint (e.g., from processing system 164, etc.), storing the fingerprint with a result of the service response (e.g., in the hash map, etc.), and processing the service request (e.g., authorizing a service provided by processing system 164 or authorizing a transaction, denying a service provided by processing system 164 or a transaction, etc.). For example, requesting system 158 may obtain the service response for the service request associated with the fingerprint, store the fingerprint with a result of the service response (e.g., in shared memory cluster 160, etc.), and notify requesting user 151 of the result of the service request indicated by the service response.

As shown in FIG. 4, if at step 406 a fingerprint is determined to be a known fingerprint (e.g., a previously stored, matching or corresponding fingerprint is identified or found in shared memory cluster 160, etc.), at step 410, process 400 includes determining if requesting user device 151 associated with the fingerprint is a malicious user. For example, requesting system 158 may identify requesting user device 151 as malicious based on the results stored with the fingerprint before determining a service response based on the service request. As an example, an indicator or flag may be stored with the fingerprint to indicate that the fingerprint is associated with a requesting user device 151 that is malicious (e.g., a malicious user device 154). In such an example, the indictor or flag may be a timed indicator or flag, such as variable including a time to live timer set in response to a determination that the fingerprint is associated with a requesting user device 151 that is malicious. For example, each service request of the plurality of service requests may be received by requesting system 158 within a first time period, and requesting user device 151 may be identified as malicious within a second time period after the first time period. As an example, requesting system 158 may obtain, within the second time period, a further service request for the service provided by processing system 164, the further service request being associated with requesting user 151 and requesting system 158, and automatically deny the further service request. For example, requesting system 158 may identify a current time of the time to live timer and determine whether the time to live timer is expired based on the current time to identify the fingerprint as malicious. In such an example, if the time to live timer is not expired (e.g., the current time is greater than 0, etc.), requesting system 158 may determine that the fingerprint is associated with a requesting user device 151 that is malicious and, if the time to live timer is expired (e.g., the current time is 0, etc.), the requesting system 158 may determine that the fingerprint is not associated with a requesting user device 151 that is malicious.

As shown in FIG. 4, if at step 410 the requesting user device 151 is determined as malicious, at step 412, process 400 includes flagging or blocking the service request associated with the requesting user device 151. For example, requesting system 158 may flag or block the service request before (and/or without) determining a service response based on the service request. As an example, requesting system 158 (or processing system 164) may block service requests according to fingerprints (e.g., not only according to IP addresses, etc.) associated therewith. In such an example, requesting system 158 (or processing system 164) may block the service request without determining a service response corresponding to the service request, which can avoid processing of the service request to generate a service response. In such an example, a HTTP 403 Forbidden error response may be sent back to requesting user 151. Accordingly, non-limiting embodiments or aspects may reduce or save processing resources by blocking or dropping malicious traffic to improve Secure Acceptance (SA) performance, which otherwise uses resource intensive processing to identify malicious users.

In some non-limiting embodiments or aspects, in response to identifying requesting user device 151 as malicious, requesting system 158 may implement or initiate at least one cyberattack against requesting user 151. For example, requesting system 158 may determine a type of cyberattack to implement or initiate according to one or more parameters associated with one or more service requests used to determine that requesting user device 151 is malicious. As an example, a cyberattack may include at least one of the following: a Denial-of-service (DoS) attack, a distributed denial-of-service (DDoS) attack, a Man-in-the-middle (MitM) attack, a Phishing attack, a Drive-by attack, a Password attack, a SQL injection attack, a Cross-site scripting (XSS) attack, an Eavesdropping attack, a Birthday attack, a Malware attack, or any combination thereof. In such an example, a cyberattack may include a "soft retaliation", such as keeping the malicious user device stack busy waiting for a response that is being provided (e.g., dripping, etc.) byte by byte (e.g., due to "rate limiting", etc.), sending a response crafted to require a relatively expensive computation at requesting user device 151 (e.g., convoluted tags in HTML response, a JS code to render a CPU intense task, etc.), and/or the like.

As shown in FIG. 4, if at step 410 requesting user device 151 is determined as not malicious, at step 414, process 400 includes obtaining a service response associated with the service request. For example, requesting system 158 may provide the service request to processing system 164, which generates the service response based on the service request and provides the service response to requesting system 158.

As shown in FIG. 4, at step 416, process 400 includes updating the results for the fingerprint based on a result of the service response to the service request. For example, requesting system 158 updates the results stored with the fingerprint based on the result of the service response to the service request.

In some non-limiting embodiments or aspects, a result of a service response to a service request includes an acceptance/authorization or a denial of the service request (e.g., an acceptance/authorization for a service provided by processing system 164, an acceptance/authorization of a transaction by transaction service provider system 108, a denial of a service provided by processing system 164, a denial of a transaction by transaction service provider system 108, etc.). In some non-limiting embodiments or aspects, results stored with a fingerprint include a number of accepted service requests (and/or transactions) associated with the fingerprint, a total number of service requests (and/or transactions) associated with the fingerprint, a number of denied service requests (and/or transactions) associated with the fingerprint, a time to live indicator or flag that indicates the fingerprint is associated with a requesting user 151 that is malicious during a period of time indicated by a timer associated therewith (e.g., during a period of time before expiration of the time to live timer, etc.), or any combination thereof.

As shown in FIG. 4, at step 418, process 400 includes determining if the service request is a first service request after an expiration of the time to live timer associated with the indicator or flag that indicates that the requesting user device 151 associated with the fingerprint is malicious. For example, requesting system 158 may obtain another service request for the service provided by processing system 164, the another service request being a first service request received at requesting system 158 from requesting user 151 after expiration of the second time period, obtain, another service response associated with the another service request, the another service response being associated with an acceptance or a denial of the service at processing system 164, and determine whether to continue to identify requesting user 151 as malicious according to the acceptance or the denial of the service at processing system 164. As an example, expiration of the time to live time associated with a fingerprint may reset the results associated with the fingerprint (e.g., to 0, etc.), and requesting system 158 may identify the total number of service requests (and/or the total number of transactions) associated with the fingerprint and determine whether the service request is a first service request after an expiration of the time to live timer based on the total number of service requests (and/or transactions) associated with the fingerprint. In such an example, if the total number of service requests or transactions associated with the fingerprint is 1, requesting system 158 may determine that the service request is a first service request after an expiration of the time to live timer and, if the total number of service requests or transactions is greater than 1, requesting system 158 may determine that the service request is not a first service request after an expiration of the time to live timer.

As shown in FIG. 4, if at step 418 the service request is determined to be a first service request after an expiration of the time to live timer, at step 420, process 400 includes determining if a result of the service request is an acceptance or a denial. For example, requesting system 158 may determine that the service request is an acceptance or a denial according to the service response associated with the service request.

As shown in FIG. 4, if at step 420 the result of the service request is a denial (e.g., the service request or the transaction is denied by processing system 164 in the service response, etc.), at step 422, process 400 includes identifying the fingerprint as malicious and setting the time to live timer to a time period (e.g., a predetermined time period, such as 60 seconds, and/or the like, according to a dynamic time period determined based on one or more parameters associated with the service request, such as a date, a time of day, and/or the like, etc.). For example, requesting system 158 may set (e.g., reset, etc.) the time to live indicator or flag to a time period which begins to countdown or decrement after being initially set. As an example, the time to live timer may countdown or decrement while stored in the hash map and/or shared memory cluster 160. In such an example, a result not accepting (e.g., denying, etc.) the service request or transaction may enable the fingerprint to be identified as malicious for a subsequent time period of the time to live timer.

As shown in FIG. 4, if at step 420 the result of the service request is an acceptance (e.g., the service request or transaction is authorized or accepted by processing system 164 in the service response, etc.), at step 424, process 400 includes identifying the fingerprint as not malicious. For example, requesting system 158 may not set (e.g., may not reset, etc.) the time to live timer from a current value of 0. In such an example, a result accepting the service request or transaction may enable the current service response (and further service responses) to be provided to requesting user device 151 (e.g., results associated with the fingerprint may be rest and service requests associated with the fingerprint may not be blocked as malicious unless the threshold discussed herein below are again satisfied, etc.) Accordingly, after a time period in which a fingerprint is identified as malicious expires, a single device request associated with the fingerprint request may be evaluated to determine whether to continue to identify the fingerprint as malicious. Accordingly, if service requests associated with legitimate fingerprint are being blocked because the fingerprint is identified as malicious due to a downstream dependency issue (e.g., a specific merchant processor having an issue resulting in all declines, etc.), non-limiting embodiments or aspects may only add the time period of the time to live timer to a duration of the original issue caused by the downstream dependency. It is noted that for mathematical correctness, timer or counter values may be conditioned to sit exactly on the tipping point to prevent miscalculations of the outcome.

As shown in FIG. 4, if at step 418 the service request is determined to not be a first service request after an expiration of the time to live timer, at step 426, process 400 includes determining if a number of service requests (and/or transactions) associated with the fingerprint satisfies a threshold number of service requests (and/or transactions). For example, requesting device 158 may identify the number of service requests or transactions associated with the fingerprint from the results stored in association with the fingerprint and determine if the number satisfies a threshold number of service requests or transactions (e.g., a predetermined threshold number of service requests or transactions, such as 25, and/or the like, a dynamic threshold number of service requests or transaction determined according to one or more parameters associated with the service request, such as a date, a time of day, and/or the like, etc.).

As shown in FIG. 4, if at step 426 the number of service requests (and/or transactions) associated with the fingerprint does not satisfy the threshold number, at step 428, process 400 includes identifying the fingerprint as not malicious. For example, requesting system 158 may not set (e.g., may not reset, etc.) the time to live timer from a current value of 0. In such an example, an HTTP 200 OK response may be sent back to requesting user 151.

As shown in FIG. 4, if at step 426 the number of service requests (and/or transactions) associated with the fingerprint satisfies the threshold number, at step 430, process 400 includes determining if a ratio of accepted service requests or transactions associated with the fingerprint to the total number of service requests or transactions associated with the fingerprint is greater than a threshold ratio. For example, requesting device 158 may identify the number of service requests or transactions and the number of the service requests or transactions that were accepted from the results stored in association with the fingerprint and determine if the ratio satisfies a threshold ratio (e.g., a predetermined ratio, such as 10%, and/or the like, a dynamic ratio determined according to one or more parameters associated with the service request, such as a date, a time of day, and/or the like, etc.).

As shown in FIG. 4, if at step 430 the ratio does not satisfy the threshold ratio, processing returns to step 428 of process 400, at which the fingerprint is identified as not malicious. For example, requesting system 158 may not set (e.g., may not reset, etc.) the time to live timer from a current value of 0. In such an example, an HTTP 200 OK response may be sent back to requesting user 151.

As shown in FIG. 4, if at step 430 the ratio satisfies the threshold ratio, at step 432, process 400 includes identifying the fingerprint as malicious and setting the time to live timer to the time period (e.g., a predetermined time period, such as 60 seconds, and/or the like, according to a dynamic time period determined based on one or more parameters associated with the service request, such as a date, a time of day, and/or the like, etc.). For example, requesting system 158 may set (e.g., reset, etc.) the time to live indicator or flag to a time period which begins to countdown or decrement after being initially set. As an example, the time to live timer may countdown or decrement while stored in the hash map and/or shared memory cluster 160.

Figure 5:
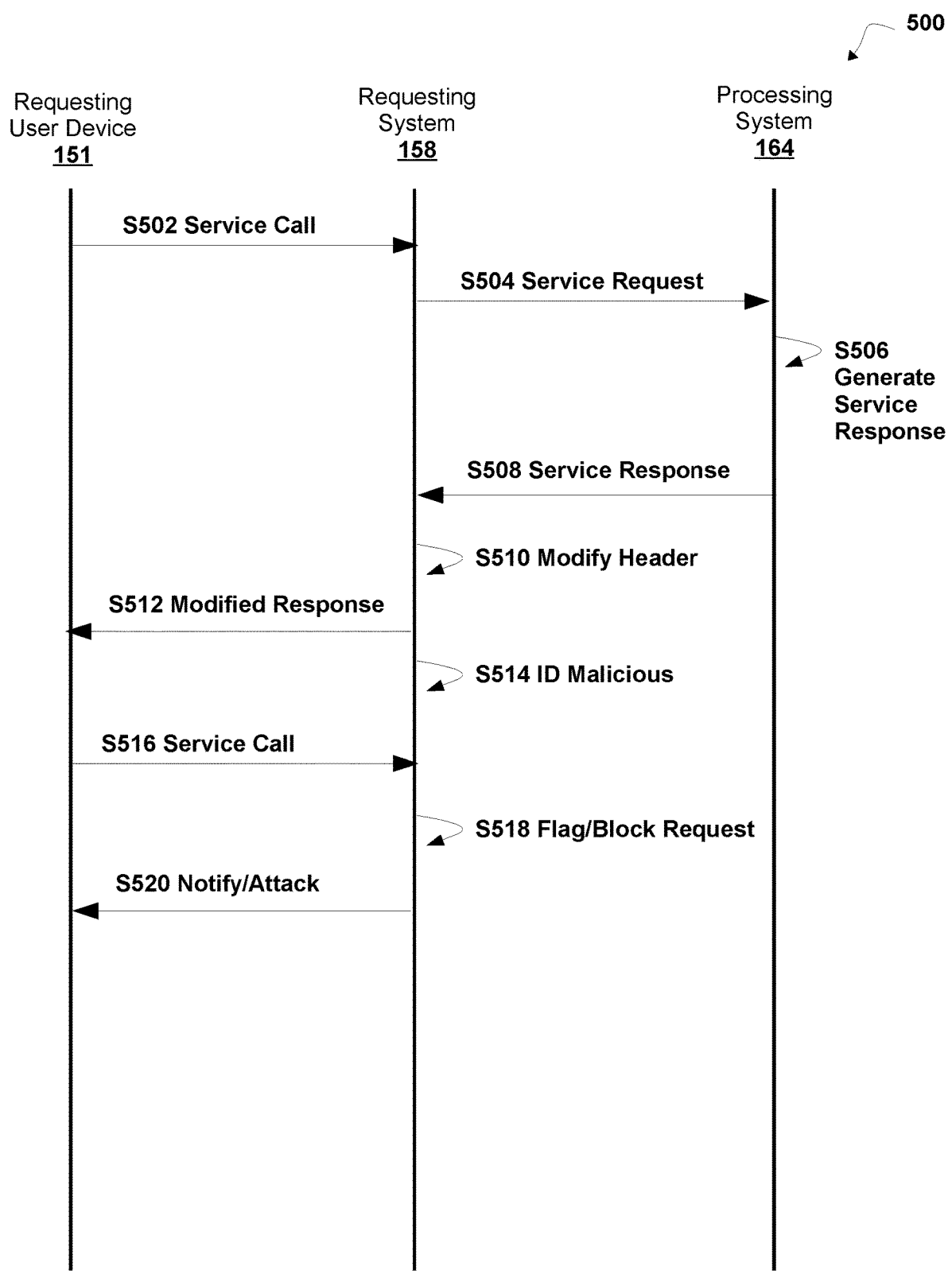
FIG. 5 is a signal flow diagram of an implementation of non-limiting embodiments or aspects of one or more of the processes shown in FIGS. 3 and 4.

FIG. 5 is a signal flow diagram of an implementation 500 of non-limiting embodiments or aspects of one or more of the processes shown in FIGS. 3 and 4. As shown by reference number S502 in FIG. 5, requesting system 158 may receive a service call from requesting user device 151. As shown by reference number S504 in FIG. 5, requesting system 158 may transmit a service request based on the service call to processing system 164. As shown by reference number S506, processing system 164 may generate a service response based on the service request. As shown by reference number S508, processing system 164 may transmit the service response to requesting system 158. As shown by reference number S510, requesting system 158 may modify the service response (e.g. remove response data from a header thereof, etc.). As shown by reference number S512, requesting system 158 may transmit the modified response to requesting user device 151. As shown by reference number S514, requesting system 158 may identify requesting user device 151 as malicious. As shown by reference number S516, requesting system may receive another service call from requesting user device 151. As shown by reference number S518, requesting system 158 may flag and/or block the service request/call. As shown by reference number S520, requesting system 158 may transmit a notification of the flagged and/or blocked service request/call to requesting user device 151 and/or implement or initiate a cyberattack against requesting user device 151.

Figure 6:
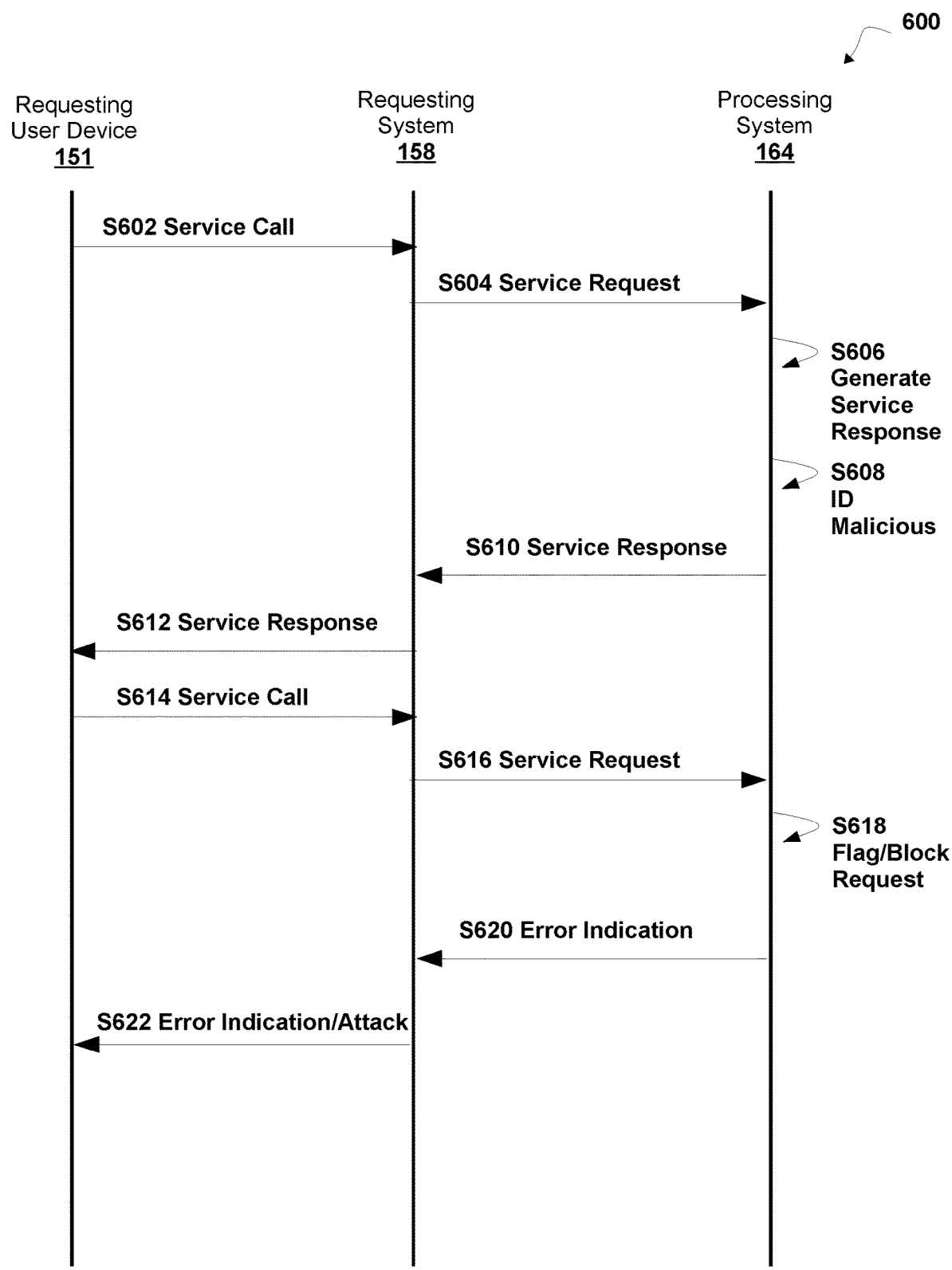
FIG. 6 is a signal flow diagram of an implementation of non-limiting embodiments or aspects of one or more of the processes shown in FIGS. 3 and 4.

FIG. 6 is a signal flow diagram of an implementation 600 of non-limiting embodiments or aspects of one or more of the processes shown in FIGS. 3 and 4. As shown by reference number S602, requesting system 158 may receive a service call from requesting user device 151. As shown by reference number S604, requesting system 158 may transmit a service request based on the service call to processing system 164. As shown by reference number S606, processing system 164 may generate a service response based on the service request. As shown by reference number S608, processing system 164 may identify requesting user device 151 as malicious. As shown by reference number S610, processing system 168 may transmit a service response to requesting system 158. As shown by reference number S612, requesting system 158 forward the service response to requesting user device 151. As shown by reference number S614, requesting system 158 may receive another service call from requesting user device 151. As shown by reference number S616, requesting system 158 may determine and transmit a service request to processing system 168. As shown by reference number S618, processing system 168 may flag and/or block the service request. As shown by reference number S620, requesting system 168 may transmit an error indication (e.g., an HTTP 404 error response, etc.) to requesting system 154. As shown by reference number S622, requesting system 158 may transmit the error notification to requesting user device 151 and/or implement or initiate a cyberattack against requesting user device 151.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method for identifying a malicious user, comprising:

obtaining, with at least one processor, a plurality of service requests for a service provided by a processing system, wherein each service request of the plurality of service requests is associated with a requesting user and a requesting system;

providing, with at least one processor, the plurality of service requests to the processing system;

receiving, with at least one processor, from the processing system, a plurality of service responses associated with the plurality of service requests, wherein each service response of the plurality of service responses includes response data associated with an acceptance or a denial of the service at the processing system inserted as a header value in a HyperText Transfer Protocol (HTTP) response of that service response;

identifying, with at least one processor, the requesting user as malicious based on the plurality of service requests and the plurality of service responses, wherein each service request of the plurality of service requests is received by the requesting system within a first time period, and wherein the requesting user is identified as malicious within a second time period after the first time period;

obtaining, with at least one processor, another service request for the service provided by the processing system, wherein the another service request is a first service request received at the requesting system from the requesting user after expiration of the second time period;

obtaining, with at least one processor, another service response associated with the another service request, wherein the another service response is associated with an acceptance or a denial of the service at the processing system; and determining, with at least one processor, whether to continue to identify the requesting user as malicious according to the acceptance or the denial of the service at the processing system.

2. The computer-implemented method of claim 1, further comprising:

receiving, with at least one processor, at least one further service request from the requesting user; and based on identifying the requesting user as malicious, at least one of flagging and blocking, with at least one processor, the at least one further service request.

3. The computer-implemented method of claim 1, further comprising:

modifying, with at least one processor, the plurality of service responses by removing the response data associated with the acceptance or the denial of the service for each service response inserted as the header value in the HTTP response of that service response; and providing, with at least one processor, the plurality of modified service responses to the requesting user.

4. The computer-implemented method of claim 1, further comprising:

receiving, with at least one processor, the plurality of service requests from the requesting system; and generating, with at least one processor, the plurality of service responses.

5. The computer-implemented method of claim 4, further comprising:

receiving, with at least one processor, at least one further service request associated with the requesting user from the requesting system; and in response to receiving the at least one further service request, providing, with at least one processor, an indication that the requesting user is malicious to the requesting system.

6. The computer-implemented method of claim 5, wherein the indication that the requesting user is malicious includes a HyperText Transfer Protocol (HTTP) response.

7. The computer-implemented method of claim 1, wherein the requesting user is identified as malicious based on at least one threshold and at least one of a number of the acceptances included in the plurality of service responses with respect to a number of the plurality of service requests and a number of the denials included in the plurality of service responses with respect to the number of the plurality of service requests.

8. The computer-implemented method of claim 7, wherein the at least one threshold dynamically changes with respect to at least one parameter associated with the plurality of service requests.

9. The computer-implemented method of claim 1, further comprising:

obtaining, with at least one processor, within the second time period, a further service request for the service provided by the processing system, wherein the further service request is associated with the requesting user and the requesting system; and automatically denying, with at least one processor, the further service request.

10. The computer-implemented method of claim 1, further comprising:

determining, with at least one processor, a fingerprint associated with the requesting user based on a first service request of the plurality of service requests;

determining, with at least one processor, a further fingerprint based on a further service request; and determining, with at least one processor, that the further service request is associated with the same requesting user based on the fingerprint and the further fingerprint.

11. The computer-implemented method of claim 1, wherein the service provided by the processing system includes a transaction authorization service, and wherein the plurality of service requests includes a plurality of transaction authorization service requests associated with a plurality of transactions between the requesting user and the requesting system.

12. The computer-implemented method of claim 1, further comprising:

in response to identifying the requesting user as malicious, implementing, with at least one processor, at least one cyberattack against the requesting user.

13. A computing system for identifying a malicious user, comprising:

one or more processors programmed and/or configured to:

obtain a plurality of service requests for a service provided by a processing system, wherein each service request of the plurality of service requests is associated with a requesting user and a requesting system;

provide the plurality of service requests to the processing system;

receive from the processing system, a plurality of service responses associated with the plurality of service requests, wherein each service response of the plurality of service responses includes response data associated with an acceptance or a denial of the service at the processing system inserted as a header value in a HyperText Transfer Protocol (HTTP) response of that service response;

identify the requesting user as malicious based on the plurality of service requests and the plurality of service responses, wherein each service request of the plurality of service requests is received by the requesting system within a first time period, and wherein the requesting user is identified as malicious within a second time period after the first time period;

obtain another service request for the service provided by the processing system, wherein the another service request is a first service request received at the requesting system from the requesting user after expiration of the second time period;

obtain another service response associated with the another service request, wherein the another service response is associated with an acceptance or a denial of the service at the processing system; and determine whether to continue to identify the requesting user as malicious according to the acceptance or the denial of the service at the processing system.

14. The computing system of claim 13, wherein the one or more processors are further programmed and/or configured to:

receive at least one further service request from the requesting user; and based on identifying the requesting user as malicious, at least one of flag and block the at least one further service request.

15. The computing system of claim 13, wherein the one or more processors are further programmed and/or configured to:
modify the plurality of service responses by removing the response data associated with the acceptance or the denial of the service for each service response inserted as the header value in the HTTP response of that service response; and
provide the plurality of modified service responses to the requesting user.

16. The computing system of claim 13, wherein the one or more processors are further programmed and/or configured to:
obtain, within the second time period, a further service request for the service provided by the processing system, wherein the further service request is associated with the requesting user and the requesting system; and
automatically deny the further service request.

17. A computer program product comprising at least one non-transitory computer-readable medium including program instructions that, when executed by at least one processor, cause the at least one processor to:
obtain a plurality of service requests for a service provided by a processing system, wherein each service request of the plurality of service requests is associated with a requesting user and a requesting system;
provide the plurality of service requests to the processing system;
receive from the processing system, a plurality of service responses associated with the plurality of service requests, wherein each service response of the plurality of service responses includes response data associated with an acceptance or a denial of the service at the processing system inserted as a header value in a HyperText Transfer Protocol (HTTP) response of that service response;
identify the requesting user as malicious based on the plurality of service requests and the plurality of service responses, wherein each service request of the plurality of service requests is received by the requesting system within a first time period, and wherein the requesting user is identified as malicious within a second time period after the first time period;
obtain another service request for the service provided by the processing system, wherein the another service request is a first service request received at the requesting system from the requesting user after expiration of the second time period;
obtain another service response associated with the another service request, wherein the another service response is associated with an acceptance or a denial of the service at the processing system; and
determine whether to continue to identify the requesting user as malicious according to the acceptance or the denial of the service at the processing system.

18. The computer program product of claim 17, wherein the instructions further cause the at least one processor to:
receive at least one further service request from the requesting user; and
based on identifying the requesting user as malicious, at least one of flag and block the at least one further service request.

19. The computer program product of claim 17, wherein the instructions further cause the at least one processor to:
modify the plurality of service responses by removing the response data associated with the acceptance or the denial of the service for each service response inserted as the header value in the HTTP response of that service response; and
provide the plurality of modified service responses to the requesting user.

20. The computer program product of claim 17, wherein the instructions further cause the at least one processor to:
obtain, within the second time period, a further service request for the service provided by the processing system, wherein the further service request is associated with the requesting user and the requesting system; and
automatically deny the further service request.

* * * * *